(12) United States Patent
Hodge

(10) Patent No.: US 10,115,144 B2
(45) Date of Patent: *Oct. 30, 2018

(54) ONLINE ORDERING SYSTEM AND METHOD FOR KEYED DEVICE

(71) Applicant: HODGE PRODUCTS, INC., Santee, CA (US)

(72) Inventor: Anthony A. Hodge, San Diego, CA (US)

(73) Assignee: HODGE PRODUCTS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,103

(22) Filed: May 31, 2017

(65) Prior Publication Data

US 2017/0262920 A1    Sep. 14, 2017

Related U.S. Application Data

(60) Continuation of application No. 13/950,157, filed on Jul. 24, 2013, now Pat. No. 9,710,840, which is a division of application No. 12/427,621, filed on Apr. 21, 2009, now Pat. No. 8,521,600.

(60) Provisional application No. 61/047,168, filed on Apr. 23, 2008.

(51) Int. Cl.
*G06Q 30/00* (2012.01)
*G06Q 30/06* (2012.01)

(52) U.S. Cl.
CPC ..... *G06Q 30/0627* (2013.01); *G06Q 30/0601* (2013.01); *G06Q 30/0603* (2013.01)

(58) Field of Classification Search
CPC .................................................... G06Q 30/00

USPC ........................................................ 705/26.5
See application file for complete search history.

(56) References Cited

U.S. PATENT DOCUMENTS

| 8,521,600 B2 * | 8/2013 | Hodge ............... G06Q 30/0601 705/26.5 |
| 2007/0125680 A1 | 6/2007 | Konop et al. |
| 2009/0101711 A1 | 4/2009 | Grayson |

(Continued)

FOREIGN PATENT DOCUMENTS

| JP | 2006125118 A | 5/2006 |
| KR | 1020000054503 A | 9/2000 |
| KR | 1020070038587 A | 4/2007 |

OTHER PUBLICATIONS

Ordering Information Key Number Range by Products, p. 8 from Master Locks Catalog, date unknown.

(Continued)

*Primary Examiner* — Russell S Glass
(74) *Attorney, Agent, or Firm* — Procopio, Cory, Hargreaves & Savitch LLP

(57) ABSTRACT

An online lockable device ordering system and method for lockable devices such as padlocks including a key matching module configured for user entry of at least one key identifier configured to unlock certain lockable devices. The key matching module matches the key identifier with a range of stored key identifiers stored in a storage device. Images of lockable devices corresponding to the matched range are displayed on a user display screen, and the user can select a lockable device from the displayed images. The selected lockable device is customized to open with the user's existing key.

12 Claims, 48 Drawing Sheets

(56) References Cited

U.S. PATENT DOCUMENTS

2012/0265596 A1  10/2012  Mazed et al.

OTHER PUBLICATIONS

Master Locks home page, Archive of Jan. 2007, http://web.archive.org/web/20070311022859js_/www.masterlocks.com/default.asp.
MasterLocks.com, Rekeying Kit, Key Blanks, and Parts, Jan. 2007, http://web.archive.org/web/20070206013122/www.masterlocks.com/Parts.htm.
Master Locks, Door Key Compatible Padlocks, Jan. 2007, http://web.archive.org/web/20070206204817/www.masterlocks.com/door_keycompatible.htm.
Master Locks Available Padlocks and Cylinders, Jan. 2007, http://web.archive.org/web/200700208121735/www.masterlocks.com/available_padlocks_door.htm.
Padlock Order Page, Masterlocks, Jan. 2007.
Masterlocks Available Keyways-Door Key Compatible, Jan. 2007, http://web.archive.org/web/20070208121940/www.masterlocks.com/Cylinder.htm.
Master Locks, Shackles for Pro Series Padlocks, Jan. 2007, http://web.archive.org/web/20070206204959/www.masterlocks.com/shacklesforrekeyablepadlock.
Masterlocks.com, Internet Archive, Aug. 18, 2007, accessed on May 26, 2015 at http://web.archive.org/web/20070818025618/http://www.masterlocks.com/default.asp, 6 pages.
International Search Report and Written Opinion of the International Searching Authority for PCT/US2009/041360, issued by the Korean Intellectual Property Office, dated May 4, 2015 in 14 pages.
http://web.archive.org/web/20071205132927/http://masterlocks.com/show_cat.asp?cat=Pro-Series.

\* cited by examiner

Select the Lock you want to customize
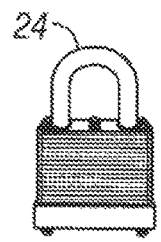
No. 2 Padlocks
Brass Laminated
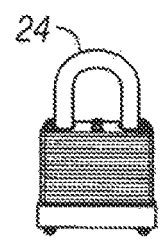
No. 4 Padlocks
Keyed Different
Brass construction offers maximum corrosion resistance
Select Lock Body
*FIG. 6A*

Step 1: Select your lock type
Use the options below to start build your custom lock.
You are here: Build a lock > Lock Group
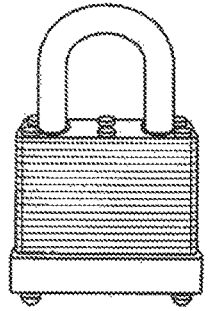 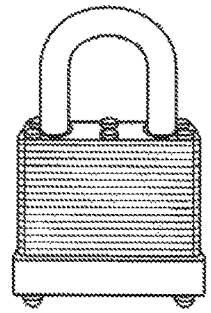
Laminated Steel   Laminated Brass
General security, 4-   Provides excellent
pin cylinder          corrosion prevention
Starting Price:       Starting Price:
$2.5                  $4.79
[ customize ▷ ]       [ customize ▷ ]
*FIG. 6B*

Body shown with standard shackle    Lock Body No. 2 Padlocks

Manufacturer: XYZ Co.    Key Blank: 1K

Description: Brass Laminated

Select A Keying Option

KD  29—◉  Each lock in series opens with a different key. No Duplicates.

KA  29—○  All locks you purchase in this series can be opened with the same key.

MK  29—○  Each lock in series opens with a different key. No duplicates. But they may also be opened by a master key. Perfect for schools and companies with a lot of lockers.

31—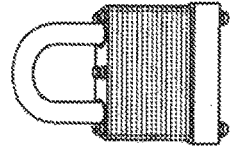 Select

FIG. 7A

Step 3: Select a keying option

Use the options below to select one of the available keying options for your lock type.

You are here: Build a lock > Lock Group > Lock body > Keying option

⊙ Keyed Different (KD) - — 29 — 214
Each lock is opened by its own unique key that does not open any other lock in the set. Keyed Different is the standard keying default on Master Lock padlocks.
Add: $0

○ Keyed Alike (KA) - — 29
This option provides "same key" convenience and eliminates the need for multiple keys where numerous padlocks are used. All padlocks in the set are opened by the same key. KA in the product number (ie 3KA) designates that the products are Keyed Alike. In some cases, the customer can select a key code for the KA locks.
$12

○ Master Keyed (MK) - — 29
In a Master Keyed System, a master key opens all the locks in the system although each lock also has its own unique key. This permits organizing master key systems along departmental or other functional lines to allow supervisory or emergency access. MK in the product number designates that the products will be Master Keyed. If the customer is adding on to an existing MK system, please specify the master key code.
$1.9

Summary: Your Lock

 — 216

Details:
Lock Body: No.4
Manufacturer: XYZ Co.
Keying Option: N/A
Shackle: N/A
Bumper: N/A
Custom Marking: N/A
Custom Text: N/A
Key Number: N/A
Total # of Extra Keys: 0

UNIT COST:
• Body                          $5.79
• Keying Option Cost:        $0
• Shackle:                         $0
• Bumper:                         $0
• Custom Text Cost           $0
• Extra Keys:                     $0
• Matching key# cost:       $0

Total (per lock):         $5.79

[◁ Go back and edit]   [Proceed to next step ▷] — 31

FIG. 7B

Step 4: Select a shackle

Use the options below to select one of the available shackles for this lock body.

You are here: Build a lock > Lock Group > Lock body > Keying option > Shackles

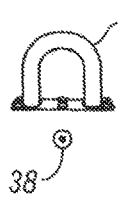

Model: Standard
Diameter (a): 9/32" (7mm)
Length (b): 3/4" (19mm)
Width (c): 5/8" (16mm)
Material: Steel
Cost: $0

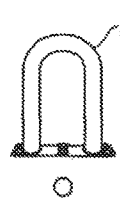

Model: LP
Diameter (a): 9/32" (7mm)
Length (b): 1-1/2" (38mm)
Width (c): 5/8" (16mm)
Material: Steel
Cost: $1.14

Model: LH
Diameter (a): 9/32" (7mm)
Length (b): 2" (51mm)
Width (c): 5/8" (16mm)
Material: Steel
Cost: $0

Summary: Your Lock

Details:
Lock Body: No.4
Manufacturer: XYZ Co.
Keying Option: Keyed Different (KD)
Shackle: N/A
Bumper: N/A
Custom Marking: N/A
Custom Text: N/A
Key Number: N/A
Total # of Extra Keys: 0

UNIT COST:
* Body            $5.79
* Keying Option Cost:   $0
* Shackle:              $0
* Bumper:               $0
* Custom Text Cost      $0
* Extra Keys:           $0
* Matching key# cost:   $0

Total (per lock):    $5.79

[◁ Go back and edit]   [Proceed to next step ▷]

*FIG. 8B*

Body shown with your shackle

Lock Body No. 2 Padlocks  2KDBLF  2" Shackle

Manufacturer: XYZ Co.   Key Blank: 1K

Description: Brass Laminated

Each lock in series opens with a different key. No duplicates

— 44

Available Bumpers

| 45 — BLACK $0.00 ○ | 45 — BLUE $0.20 ○ | 45 — RED $0.20 ⊙ —48 | 45 — GREEN $0.20 ○ —48 | YELLOW $0.20 ○ —48 | WHITE $0.20 ○ —48 |

52 — [ Select Bumper ]

Step 5: Select a Bumper

Use the options below to select one of the available bumper colors for your lock.

You are here: Build a lock > Lock Group > Lock body > Keying option > Shackles > Bumpers Name: Black
Price: $0.32

Name: Blue
Price: $0.32

Name: Green
Price: $0.32

Name: Red
Price: $0.32

Name: White
Price: $0.32

Name: Yellow
Price: $0.32

◁ Go back and edit

Proceed to next step ▷

Summary: Your Lock

Details:
Lock Body: No.4
Manufacturer: XYZ Co.
Keying Option: Keyed Different (KD)
Shackle: Standard (19mm)
Bumper: N/A
Custom Marking: N/A
Custom Text: N/A
Key Number: N/A
Total # of Extra Keys: 0

UNIT COST:
• Body                    $5.79
• Keying Option Cost:     $0
• Shackle:                $0
• Bumper:                 $0
• Custom Text Cost        $0
• Extra Keys:             $0
• Matching key# cost:     $0

Total (per lock):        $5.79

*FIG. 9B*

Your Lock          Lock Body No. 2 Padlocks    Model # 2KDBLFRED

Manufacturer: XYZ Co.                          2" Shackle
                                               RED Bumper Description: Brass Laminated                   Key Blank: 1K Each lock in series opens with a different key. No duplicates Cost ea:    Body      $5.30
            Shackle   $0.40
            Bumper    $0.20
            Total     $5.90

Custom Body Plate

No  ⊙ —56
Yes ○ —57  $1.50 extra each lock
Text [         ] —58

[Select] —64

Step 6: Select Custom Marking

Optional - Use the options below to select Custom Marking options available for your lock type.

You are here: Build a lock > Lock Group > Lock body > Keying option > Shackles > Bumpers > Custom body plate Tag your lock with custom text?

◉ No - (don't add custom text) — 56

○ Yes - (I want custom text - $1.00 extra each lock) — 57

[◁ Go back and edit]   [Proceed to next step▷] — 64

Summary: Your Lock

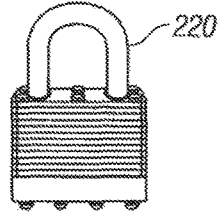
— 220

Details:
Lock Body: No.4
Manufacturer: XYZ Co.
Keying Option: Keyed Different (KD)
Shackle: Standard (19mm)
Bumper: BLUE
Custom Marking: N/A
Custom Text: N/A
Key Number: N/A
Total # of Extra Keys: 0

UNIT COST:
• Body                          $5.79
• Keying Option Cost:    $0
• Shackle:                        $0
• Bumper:                        $0.32
• Custom Text Cost       $0
• Extra Keys:                   $0
• Matching key# cost:   $0

Total (per lock):       $6.11

*FIG. 10B*

Step 6: Select Custom Marking

Optional - Use the options below to select Custom Marking options available for your lock type.

You are here: Build a lock > Lock Group > Lock body > Keying option > Shackles > Bumpers > Custom body plate Tag your lock with custom text?

○ No - (don't add custom text)

◉ Yes - (I want custom text - $1.00 extra each lock)

Enter Text [　　　] — 214  up to 6 alpha numeric characters

◉ Hard Stamping (HDST)
　　224

[◁ Go back and edit]　　[Proceed to next step ▷]

Summary: Your Lock

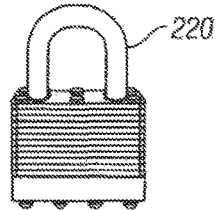
　220

Details:
Lock Body: No.4
Manufacturer: XYZ Co.
Keying Option: Keyed Different (KD)
Shackle: Standard (19mm)
Bumper: BLUE
Custom Marking: N/A
Custom Text: N/A
Key Number: N/A
Total # of Extra Keys: 0

UNIT COST:
• Body　　　　　　　$5.79
• Keying Option Cost:　$0
• Shackle:　　　　　　$0
• Bumper:　　　　　$0.32
• Custom Text Cost　　$0
• Extra Keys:　　　　　$0
• Matching key# cost:　$0

Total (per lock):　$6.11

Your Lock

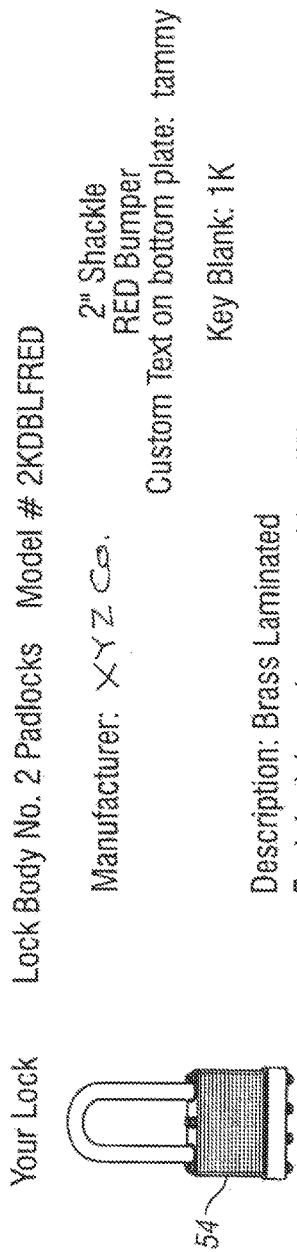

54

Lock Body No. 2 Padlocks   Model # 2KDBLFRED

Manufacturer: XYZ Co.

2" Shackle
RED Bumper
Custom Text on bottom plate: tammy

Key Blank: 1K

Description: Brass Laminated
Each lock in series opens with a different key. No duplicates.

Cost ea:
Body            $5.30
Shackle         $0.40
Bumper          $0.20
Custom Plate Text  $1.50
Total           $5.90

Match Existing System?
Your key should look similar to one shown

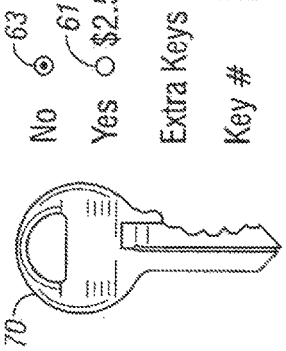

70

No ⊙ 63
Yes ○ 61  $2.50 extra each lock

Extra Keys  [0] 64   $1.50 Each

Key #  [    ] 65

[ Select ] 69

FIG. 11A

Step 7: Match an existing keying system

Optional - Use the options below to match your key number to your custom lock.

You are here: Build a lock > Lock Group > Lock body > Keying option > Shackles > Bumpers > Custom body plate > Keying system

214

Would you like to match your existing keying system?

⦿ No  63

◯ Yes - (0.69 extra each lock)
   61

Do you need any extra keys? ($1.69 Each):

-How many? [ 0 ]
              64

[◁ Go back and edit]   [Proceed to next step▷]
                        69

Summary: Your Lock

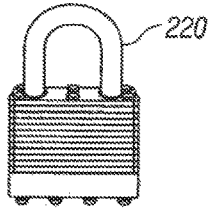
220

Details:

Lock Body: No.4
Manufacturer: XYZ Co.
Keying Option: Keyed Different (KD)
Shackle: Standard (19mm)
Bumper: BLUE
Custom Marking: HDST
Custom Text: tammy
Key Number: N/A
Total # of Extra Keys: 0

UNIT COST:
• Body              $5.79
• Keying Option Cost:  $0
• Shackle:            $0
• Bumper:          $0.32
• Custom Text Cost   $1
• Extra Keys:        $0
• Matching key# cost: $0

Total (per lock):   $7.11

*FIG. 11B*

Step 7: Match an existing keying system

Optional - Use the options below to match your key number to your custom lock

You are here: Build a lock > Lock Group > Lock body > Keying option > Shackles > Bumpers > Custom body plate > Keying system Would you like to match your existing keying system?

○ No  —63

⦿ Yes - (0.69 extra each lock)  —61

Key number: [3252]  —65

Do you need any extra keys? ($1.69 Each):

-How many? [0]  —64

[◁ Go back and edit]    [Proceed to next step▷]

Summary: Your Lock  —214

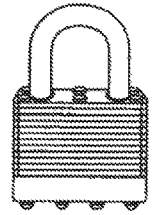

Details:
Lock Body: No.4
Manufacturer: XYZ Co.
Keying Option: Keyed Different (KD)
Shackle: Standard (19mm)
Bumper: BLUE
Custom Marking: HDST
Custom Text: tammy
Key Number: N/A
Total # of Extra Keys: 0

UNIT COST:
• Body                  $5.79
• Keying Option Cost:   $0
• Shackle:              $0
• Bumper:               $0.32
• Custom Text Cost      $1
• Extra Keys:           $0
• Matching key# cost:   $0

Total (per lock):   $7.11

*FIG. 11C*

Your Lock    Lock Body No. 2 Padlocks    Model # 2KDBLFRED

Manufacturer: XYZ Co.

2" Shackle
RED Bumper
Custom Text on bottom plate: tammy

Key Blank: 1K

54

Description: Brass Laminated

Each lock in series opens with a different key. No duplicates.

Enter Quantity to Purchase
75
[ 1 ]

Cost ea:
Body            $5.30
Shackle         $0.40
Bumper          $0.20
Custom Plate Text   $1.50
Total           $7.40

Add to Cart
77

Step 8: Review your selections
Below is the summary list of your customized locks.

You are here: Build a lock > Lock Group > Lock body > Keying option > Shackles > Bumpers > Custom body plate > Keying system > Review selections ◁ Go back and edit    Add to shopping cart ▷

Here's your custom lock:

Summary: Your Lock

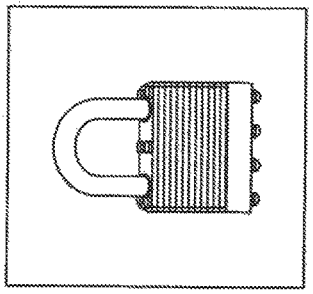

DETAILS:
Lock Body: No.4
Manufacturer: XYZ Co.
Keying Option:
Shackle: N/A
Bumper: N/A
Custom Marking: N/A
Custom Text: N/A
Key Number: N/A
Total # of Extra Keys: 0

UNIT COST:
- Body: $5.79
- Keying Option Cost: $0
- Shackle: $0
- Bumper: $0
- Custom Text Cost: $0
- Matching key# cost: $0

Total (per lock): $5.79

Enter Quantity [1]
• Cost of Extra Keys: $0.00

◁ Go back and edit    Add to shopping cart ▷

*FIG. 12B*

Shopping   Billing and Shipping   Order Review   Payment   Receipt

| | Model # | Description | Cost Ea. | Qty. | Total |
|---|---|---|---|---|---|
| Custom Lock | XYZ Co. 2KDBLFRED2050 | XYZ co. Body 2 - 2 inch shackle - Red bumper - Custom Cylinder to Key # - 2050 | $8.40 | 6 [Update] | $50.40 |
| | XYZ Co. Extra Keys | Extra Key For 2KDBLFRED2050 Keyway 2050 | $1.50 | 12 [Update] | $18.00 |

Total Before Shipping
$68.40

Orders shipped to California or Texas will also be charged sales tax.

(Continue Shopping)   (Secure Checkout)

*FIG. 13*

Build a Lock

Edit a Lock Body

Re-Upload Image

100

Re-Upload Short Body

101

Re-Upload Long Body

102

Edit Build a Lock    Shackles    Bumpers    Add a Lock Body

| | |
|---|---|
| Lock Body | 2 |
| Group | No.2 Padlocks |
| Link to Body | 2 ☑ Similar body |
| Key Blank | 1K |
| Manufacturer | XYZ co. ☑ |
| Price | 5.3 |
| Description | Brass Laminates |
| Colored Bumpers | ☑ |
| Custom Bottom Plate | ☑ |
| Custom Plate Text Size | 12 |
| Delete | ☐ |

(Update)

FIG. 14

Configure
Keyways

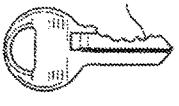

New Keyways     Show Keyway Groups

| Keyway Name | Manufacturer | KeyType | Key Blank |
|---|---|---|---|
| 15kmk | | Master | 15K Edit |

Add Keyway Range

| Keyway Numeric | to | Keyway Numeric | Keyway Non Numeric | to | Keyway Non Numeric | Key Blank | |
|---|---|---|---|---|---|---|---|
| 0 | to | 0 | 20N 001 | to | 25N 616 | 15K | Add |

Numeric     Non Numeric

Add Lock Model to Keyway

| Select Lock | 1710 ▼ —84 | | Key Blank | 15K | Add |
|---|---|---|---|---|---|
| Keyway | to | Keyway | Key Blank | Added By | Edit |
| | | 15K | | | |

| Image | Lock Model | Key Blank | Added By | |
|---|---|---|---|---|
| 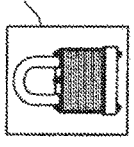 —85 | No.15 Padlock | 15K | | Edit |

FIG. 16A

ADD KEY RANGE

Keyways    New Keyway    Show Keyway Groups

| Keyway Name | Manufacturer | Key Blank |
|---|---|---|
| 15KMK | | 15K |

Edit

Add Keyway Range

| Keyway Numeric | to | Keyway Numeric | Keyway Non Numeric | to | Keyway Non Numeric | Key Blank | Delete |
|---|---|---|---|---|---|---|---|
| 0 | to | 0 | 20N 001 | to | 25N 616 | 15K | ☐ |

86    86    88    88

Update

*FIG. 16B*

Build a Lock Key Generator

The Build a lock key generator allows you to build custom locks based on your existing keys.

Enter the Key number printed on your key to see all the locks that you can buy that can be custom built to be opened by your key.

- This feature only costs an extra $1.50 per lock.
- Locks are sold in quantities of 6

Enter your key number: *94*

| 3252 | Find my locks |

No key number on your key? Please call or
Send a copy of your key to:
Hodge Products, Inc.
1410 Hill Street
El Cajon, CA 92020
Or link to http://www.keyrequest.com

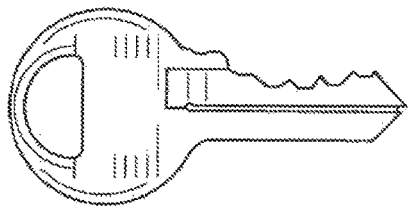

Why use the key generator?

Take advantage of all the models available with your keyway...also reduce the amount of keys you have on hand.

*FIG. 17B*

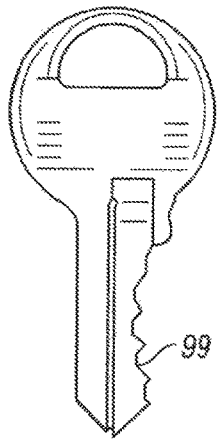

150 — You Entered Keyway 2050 - Your key should look like the one on the left All the locks that you can buy that can be custom built to be opened by your key are shown below. Each of these locks come in a variety of options - Keyed Alike, Master Keyed, different shackle lengths, etc click on the Show Models link to see options for a particular lock.

99

This feature only costs an extra $1.50 per lock. Locks are sold in quantities of 6

| Keyway Range | 2001 | To | 2997 |
|---|---|---|---|
| Image | Lock Model | Key Blank | |

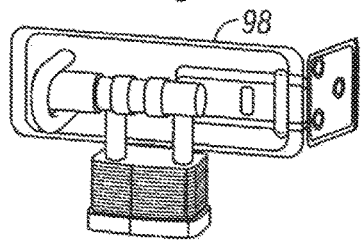

| | No. 475 Hasplocks | 1K | Show Models 152 |

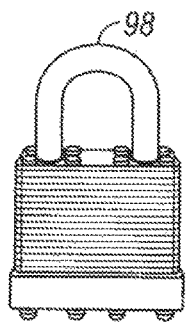

| | No. 2 Padlocks<br>Click here to Customize this Lock 104 | 1K | Show Models 152 |

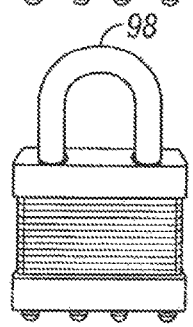

| | No. 1 Padlocks<br>Click here to Customize this Lock 104 | 1K | Show Models 152 |

Retail Price $14.38 ea.    Your Price $12.76 ea.

Keyed Different; 1-1/2" (38mm) shackle

Hardened steel shackle

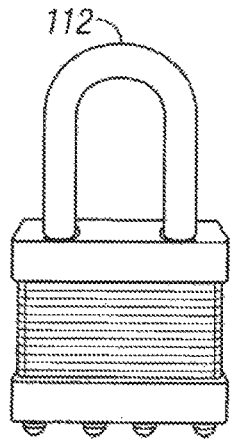

Qty. 117  120

Click thumbnails for larger images

114

Comments / Instructions / Keyway 119

Return to list of Laminated
Steel Pin Tumbler Padlocks 116

- 1-9/16
- Key retaining feature ensures padlock is not left unlocked
- Hardened steel shackle for extra cut resistance
- 4-Pin cylinder helps prevent picking
- Dual locking levers provide extra pry resistance
- Thousands of key changes maximize key integrity
- Proprietary rustproofing for longer life

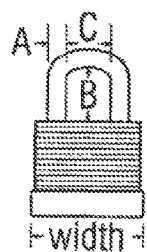

| | Inches/Metric | | |
|---|---|---|---|
| | A | B | C |
| | 9/32 | 1-1/2 | 5/8 |
| | 7mm | 38mm | 19mm |

Enter Your Shipping Information

| First Name: | Tammy | Last Name: | Watkins |
| --- | --- | --- | --- |
| Address 1: | 1410 Hill Street | Address 2: | |
| City: | El Cajon | Country: | United States ▾ |
| State/Province: | California ▾ | Zip: | 92020 |

What happens when you place your order?

☐ For an item sold by Buildalock.com: When you click the "Checkout" button, we'll send you an e-mail message acknowledging receipt of your order. Your contract to purchase an item will not be complete until we send you an e-mail notifying you that the item has been shipped.

Buildalock.com Returns Policy: Within 30 days of delivery, you may return new, unopened merchandise in its original condition. Exceptions and restrictions apply--read Buildalocks.com's complete Return Policy.

[ Checkout (place order) ▵ ]

*FIG. 20E*

| | Model # | Description | Cost Ea. | Qty. | Total |
|---|---|---|---|---|---|
| [padlock image] | 11LF | Keyed Different; 1- 1/2" (38mm) shackle Hardened steel shackle | $12.76 | 1 Update | $12.76 |

Total Before Shipping

$12.76

Orders shipped to California or Texas will also be charged sales tax.

( Continue Shopping )      ( Secure Checkout )

*FIG. 21A*

The leader in on-demand custom lock building

Thank you for your order! An email confirmation will be sent shortly for your records. We appreciate your business! Here is the list items you ordered (along with the model number for your reference): <u>Print this page</u>
Note: You can print the page for future reference.

Customized Body Image and Lock Details   Model Number   Quantity                                ◁ Back to home XYz Co.: No.3              3KALFGreenHDSTHDST3252        4         Grand Total
Keyed Alike (KA)                                                   Body:                 $5
Custom Key #: 3252                                                 Keying Option Cost:   $0.6
Extra Keys: 2                                                      Shackle:              $1.14
                                                                   Bumper:               $0.32
                                                                   Custom Text Cost:     $1
                                                                   Cost of Extra Keys:   $2
                                                                   Matching keycost:     $1.5

Total Cost:           $51.76

<u>Print this page</u>

*FIG. 21C*

ONLINE ORDERING SYSTEM AND METHOD FOR KEYED DEVICE

RELATED APPLICATION

The present application is a continuation of U.S. patent application Ser. No. 13/950,157 filed Jul. 24, 2013, which is a divisional of U.S. patent application Ser. No. 12/427,621 filed Apr. 21, 2009, issued Aug. 27, 2013 as U.S. Pat. No. 8,521,600, which claims the benefit of U.S. provisional patent application No. 61/047,168 filed Apr. 23, 2008, and the contents of each of the aforementioned applications are incorporated herein by reference in their entirety.

BACKGROUND

1. Field of the Invention

The present invention relates generally to online ordering systems and methods, and is particularly concerned with an online ordering system and method for keyed and combination lock devices such as padlocks, as well as other lock-related devices.

2. Related Art

Currently, there is no easy to use system for ordering custom made padlocks or other keyed or combination devices online. A customer typically has to wade through numerous website pages with many different choices and cannot easily obtain a listing of various padlocks with certain features in common. Another problem is that there is no easy way to order additional padlocks to be opened with the same key as previously purchased. Currently, users or customers are only able to purchase finished locks and finished padlocks on the internet.

These problems also apply to online ordering of many other products, including other keyed devices, such as keyed locking cables for bicycles or the like, and locks to be built into doors, safes, vending machines or the like. Customers may want to keep the same keys when updating locks or purchasing new safes, for example, and up to now there has been no easy method or system for ordering such devices without needing locks with new sets of keys.

SUMMARY

Embodiments described herein provide for a method and system for online ordering of user customized products such as padlocks, lockable devices or lock devices, boxes or packaging material, promotional items, or the like.

According to one embodiment, an online lockable device ordering method is provided, which allows a user to match a lock to the number or identifier on a key they already own, so that they can use the same key to open different locks, for example padlocks on various different lockers or other articles, rather than having to carry around a large number of different keys. In one embodiment, the method comprises storing information in a database comprising a list of padlock bodies or models and associated key number ranges or key identifier ranges of keys which may be used to open each padlock body in the list, receiving a key number or key identifier entered by a user, searching the list in the data base to match the entered key identifier with each padlock body which can be opened by keys in a number or key identifier range including the entered key number, displaying images of each padlock which can be opened by a key having the entered key identifier, and allowing the user to select and order one or more padlocks from the displayed images which can be opened by their existing key. This method may be used for many brands of padlocks and other items.

This method allows customers to order locks online to be opened by a specific key, rather than having to go to a lock store, lock expert, or the like for this purpose.

According to one embodiment, the method further comprises displaying a first set of customizing options for a keyway matching lockable device selected from the displayed images, receiving user input of a selected customizing option, and displaying a customized lockable device image including the customized option on a display screen, and allowing the user to order the customized lockable device. More than two options may be available to be customized, depending on the matched lockable device.

In one embodiment, the ordering method is used for ordering customized padlocks, and the options which may be customized by a user for various padlock bodies are shackle length and style, shackle material, bumper color, and a custom body plate with desired text or a logo as selected by the user. Other variables which may be customized are body size, key number or keyway cuts, and cylinder types.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 6A, 6B and 6C are screen shots illustrating one example of a lock body display after a user has selected a lock type in the input page of FIGS. 5A and 5B;

FIGS. 7A and 7B are screen shots illustrating a keying option selection screen;

FIGS. 8A and 8B are screen shots illustrating a selected lock displayed to the user with options for selecting different shackle lengths;

FIGS. 9A and 9B are screen shots illustrating display of part of the selected lock along with the selected shackle and with bumper selection options;

FIGS. 10A, 10B, 10C and 10D are screen shots illustrating display of the customized lock with the selected shackle and bumper, and an option for selecting a custom body plate;

FIGS. 11A, 11B and 11C are screen shots illustrating a display of the customized lock with key ordering options;

FIGS. 12A and 12B are screen shots illustrating display of the selected lock with lock quantity ordering options;

FIG. 13 is a screen shot of a customized lock and key ordering page;

FIG. 14 is a screen shot of a lock body entry screen provided at the back end of the system to allow an administrator to add lock body images and information;

FIGS. 16A to 16C are screen shots of entry screens provided to a system administrator for the purpose of entering key blank and keyway range information;

FIGS. 17A and 17B are screen shots of a display for allowing a user to enter a selected key number to be matched to locks which can be opened by that key;

FIGS. 18A and 18B are screen shots of a display of available locks after a key number has been entered;

FIGS. 20A to 20E are screen shots illustrating a display of details of the selected lock which allows a user to enter the number of locks to be purchased; and FIG. 21A to 21C are screen shots of a lock ordering page for ordering locks selected by keyway number.

DETAILED DESCRIPTION

Certain embodiments as disclosed herein provide for customized on-line ordering of locks and the like.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
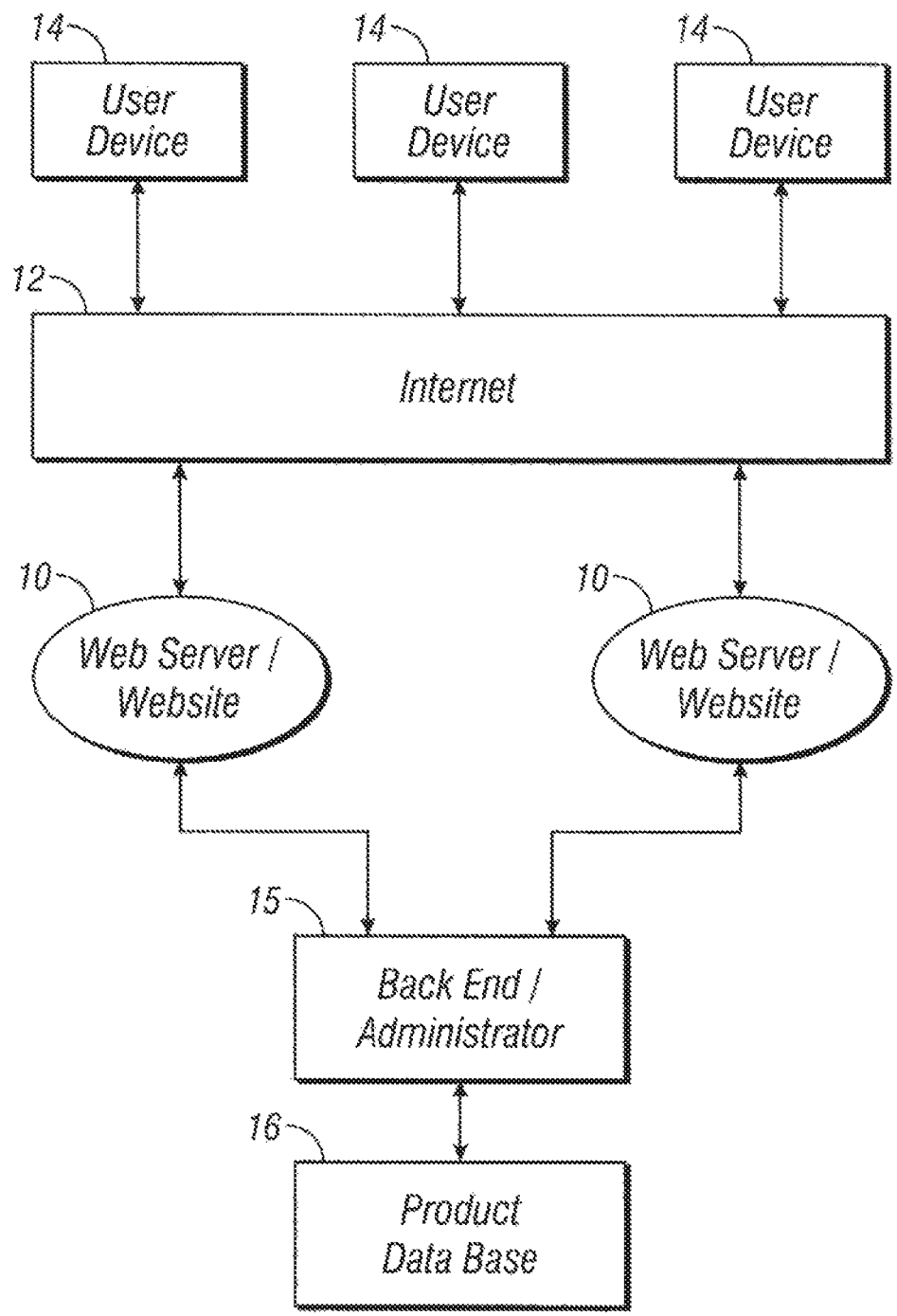
FIG. 1A is a block diagram of one embodiment of an online ordering system for keyed devices.
Figure 1B:
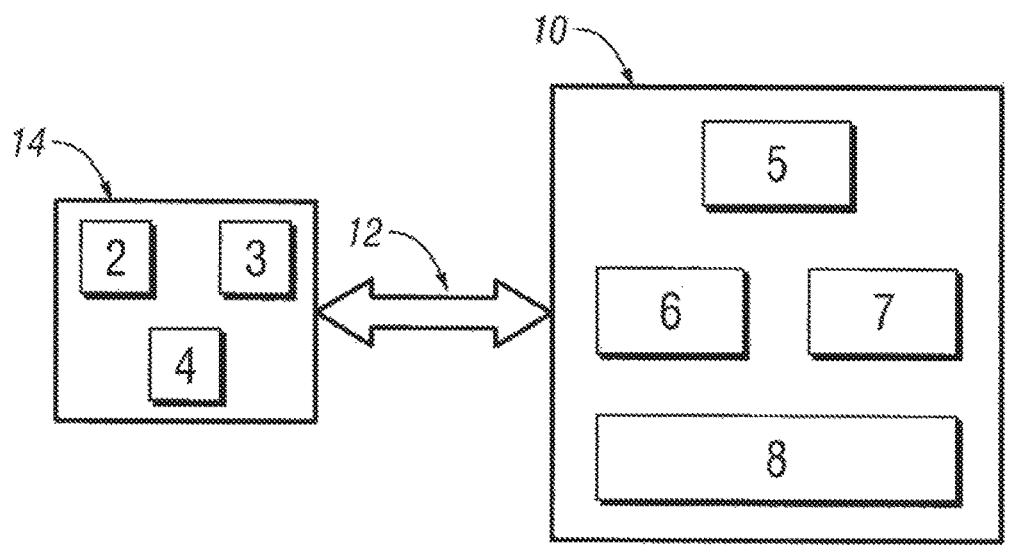
FIGS. 1B and 1C are block diagrams illustrating aspects of the online ordering system which can be carried out by the server and the user device of FIG. 1.

FIGS. 1A, 1B, 2 and 5 to 13 illustrate one embodiment of a method and system for online ordering of padlocks or other keyed or combination lock devices of different lock and padlock manufacturers, while FIGS. 3, 4 and 14 to 19 illustrate an associated keyway matching method using the system of FIGS. 1A and 1B. Although the system is described and illustrated in connection with ordering customized padlocks, the same system may alternatively be used in other embodiments for ordering other customized products, such as other key or combination lockable devices (safes, jewelry boxes, cash boxes, door locks, and the like), non-lockable products such as boxes or packaging materials, promotional products, and the like.

The system of FIG. 1A comprises one or more on-line portals or websites 10 each associated with a website address which provides user access to the portal or website over a public network 12 such as the Internet. The portal 10 can be implemented as a server or computer. A similar portal may be provided in a private network in alternative embodiments. FIG. 1A illustrates a plurality of end user devices 14 which may connect to websites 10 using a web browser on the user device 14, which may be a personal computer (PC), laptop computer, mobile device, or any other device capable of running web-browser software. Each website 10 is linked via a public or private network, or other means, to a back end administrator or central controller 15, which in turn is linked to a product data base 16 which can be updated as needed by back end administrator 15.

FIG. 1B is a block diagram illustrating aspects of the online ordering system which can be carried out by the server 10 and the user device 14 of FIG. 1A. The online ordering system includes a first, second and third user interfaces 2, 3 and 4 respectively, first, second and third selection modules 5, 6 and 7 respectively and a control module 8. The first, second and third user interfaces 2, 3 and 4 are associated with the user device 14. However, in some embodiments, the first, second and third user interfaces 2, 3 and 4 may be associated with the server 10. The first, second and third user interfaces 2, 3 and 4 may be a single user interface and the first, second and third selection modules 5, 6 and 7 may be a single selection module. The first, second and third selection modules 5, 6 and 7 are associated with the server 10. However, in some embodiments, the first, second and third user selection modules 5, 6 and 7 may be associated with the server 10. The control module 8 is associated with the server 10.

The first user interface 2 displays one or more lockable device category images representing one or more available lockable device categories. The one or more lockable device categories include one or more lockable device images. The second user interface displays one or more lockable device images associated with the selected lockable device category image. The one or more lockable device images represent one or more lockable devices. The third user interface displays multiple sets of lockable device customizing options including a first and second set of lockable device customizing options for the selected lockable device image.

The first selection module 5 generates a selection option on the user device 14 for selecting a lockable device category image from the one or more lockable device category images. The second selection module 6 generates a selection option on the user device 14 for selecting a lockable device image from the one or more lockable device images. The third selection module 7 generates selection options on the user device 14 for selecting multiple device customizing options including a first and second lockable device customizing options from the first and second set of lockable device customizing options.

The control module 8 generates a first customized lockable device image according to the selected first lockable device customizing option. The first customized lockable device image includes at least a portion of the selected lockable device image and the first lockable device customizing option. The control module also generates a second customized lockable device image according to the selected second lockable device customizing option, where the second customized lockable device image includes at least a portion of the selected lockable device image and the second lockable device customizing option. In some embodiments, the second customized lockable device image includes at least a portion of the selected lockable device image and the first and second lockable device customizing options.

Figure 1C:
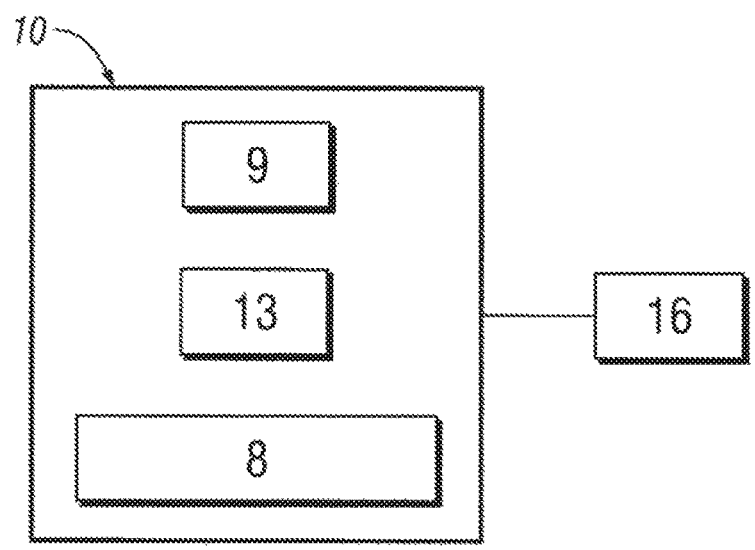

FIG. 1C is a block diagram illustrating aspects of the online ordering system which can be carried out by the server 10 and the user device 14 of FIG. 1A. The server 10 includes a first receiving module 9, a second receiving module 13, a storage device 16 such as the product database illustrated in FIG. 1 and a control module 8. The first and second receiving modules 9 and 13 may be a single receiving module.

The first receiving module 9 receives information related to one or more lockable device models and information related to one or more key identifiers associated with the one or more lockable device models. The storage device 16 stores the information related to the one or more lockable device models and the information related to the one or more key identifiers associated with the one or more lockable device models. The lockable device models may be manufactured by multiple lockable device manufactures or a single lockable device manufacturer. The key identifier may be a combination of numbers for opening a lock, a number associated with a lock key or the like. Each key identifier of the one or more key identifiers unlocks at least one lockable device associated with the one or more lockable device models. The second receiving module 13 receives a pre-existing key identifier configured to unlock a pre-existing lockable device.

The control module 8 matches the pre-existing key identifier with a matched key identifier of the one or more key identifiers stored in the storage device 16 and associates the matched key identifier with one or more matched lockable device models of the one or more lockable device models. Images of the one or more matched lockable device models that are configured to be unlocked by the matched key identifier are displayed on a user interface 2, 3 or 4 of a user device 14, for example. A selection module 5, 6, or 7 generates a selection option on the user device 14 for selecting at least one matched lockable device from the one or more matched lockable device models. In some embodiments, server 10 may also include an ordering module for ordering the at least one selected matched lockable device. The control module 8 also generates a temporary model number for the at least one selected matched lockable device prior to an authentication of the order made according to the ordering module. In some embodiments, authentication of the order comprises receiving payment for the at least one selected matched lockable device. Upon authentication of the order, the control module 8, generates an actual model number (as illustrated in FIG. 21C) for the at least one selected matched lockable device.

The method and system of this embodiment allows users to search for specific product categories via selected websites, and to customize a product as desired before ordering the customized product. In the illustrated embodiment, the product being ordered is a padlock or other type of lock or lockable device, although other products may be customized in a similar manner in alternative embodiments, as described in more detail below.

Figure 5A:
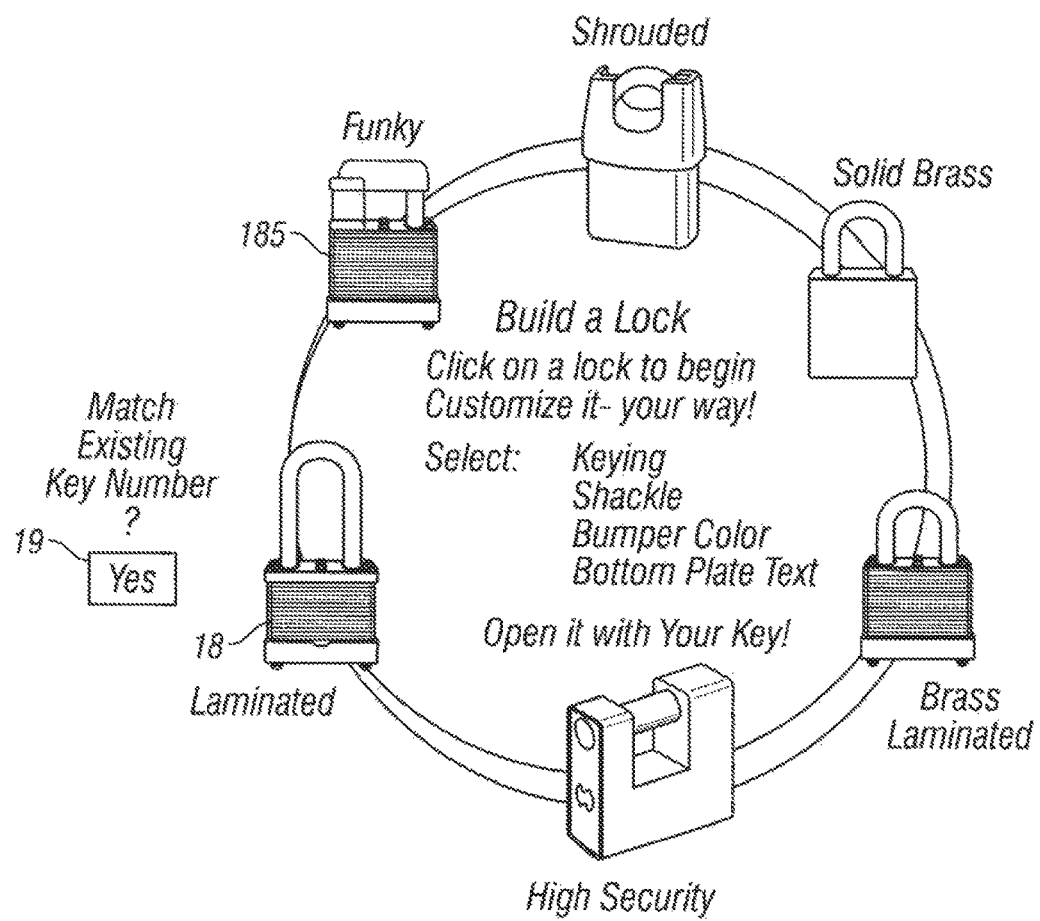
FIGS. 5A and 5B are screen shots illustrating a customized user input page in the system of FIGS. 1 to 3.

In the method and system of FIGS. 1A to 2B, and 5A to 13, a user accesses one of the websites 10 via the website address. FIGS. 5A, 6A, 7A, 8A, 9A, 10A, 11A, and 12A illustrate a first embodiment of a series of user interface screens for carrying out the method of FIGS. 5B, 6B, 6C, 7B, 8B, 9B, 10B to 10D, 11B, 11C, and 12B illustrate a modified, second embodiment in which the user interface screens are modified. The basic steps of both embodiments are the same, but the arrangement of information on the various interface screens is modified in the second embodiment, as described in more detail below. A first user selection screen is illustrated in FIG. 5A. This displays various different categories of an article or product to be customized, such as different types of padlock images 18. The categories displayed include padlocks of different materials, styles, and sizes, and may include padlocks and locks manufactured by different manufacturers. In alternative embodiments, additional lock categories may be displayed in the screen of FIG. 5A, such as cable locks or other padlock types.

The home page screen of FIG. 5A may also include an icon 19 asking the user if they wish to match an existing key number (see step 20 of FIG. 2A), although this may be eliminated in alternative embodiments. The user can select a style or type of lock by clicking on the appropriate lock icon or image 18 on the first screen of FIG. 5A (step 22 of FIG. 2A). As illustrated in FIG. 6A, the next screen illustrates the different lock body types 24 available in the selected lock style or category (step 23 of FIG. 2A). The user can click on the button 25 adjacent a selected lock body type to select a model number (step 26 of FIG. 2A), then clicks on the "Select Lock Body" button 27 to proceed to the next step.

Once a lock body is selected, the next screen (FIG. 7A) appears. This screen displays the selected lock body as well as keying options available for the selected lock body (step 28 of FIG. 2A). If all keying options are available for the selected lock body, this screen allows the user to select a keying option between the options KD (each lock opens with a different key), KA (all locks purchased open with the same key), MK (each lock opens with a different key and may also be opened with a master key), and KAMK (each lock opens with the same key and may also be opened with a master key), by selecting the appropriate button 29 and clicking on the "select" button 31. The illustrated example does not have KAMK option, but this option also appears for padlocks where it is available. If not all options are available, the user can only select between the available keying options for a selected lock body.

Once the user has selected a keying option (step 30 of FIG. 2A), a screen appears which shows alternative shackle options for the selected lock (see FIG. 8A, step 32 of FIG. 2A), along with information on the lock. This screen includes an image 34 of the selected lock body with a standard shackle, information on the lock ID, manufacturer and keying options, and images 35 of the different shackle options attached to the lock body. A button 38 is provided under each shackle option. The user selects a desired shackle (step 40) by clicking the appropriate button and then clicking "Select Shackle" 42.

In the next screen (FIG. 9A), an image 44 of the lock body along with the selected shackle appears, along with the same lock information and the statement "Body shown with your shackle". Beneath the image 44 and associated information, images 45 of the different bumpers in the available colors for that bumper are displayed (step 46), with a selection button 48 next to each available bumper. The user selects a desired bumper (step 50) by clicking on the appropriate button 48, and then clicks on the "select bumper" key 52.

The next screen (FIG. 10A) displays the lock 54 with the user-selected shackle and bumper options, along with the total cost as selected so far (step 55). This screen also allows the user to select a custom body plate by clicking on the appropriate button 56 or 57. The "yes" button 57 also indicates the cost per lock for a custom body plate. A text box 58 allows the user to enter the text or trademark information desired for the custom body plate. Once the user selects whether a custom body plate is desired (step 60), and inserts the appropriate text (step 62) if the yes button is selected, they click on the "select" button 64. The next display screen (FIG. 11A) displays the same lock information as FIG. 10A, but includes the cost of any custom plate text ordered in steps 60 and 62. On the same display screen, the user is allowed to order the desired number of extra keys (block 64, step 66 of FIG. 2A), and may also select whether to match to an existing key number by selecting the yes or no button 61 or 63, and entering the key number in block 65 (step 68 of FIG. 2A) if "yes" is selected. This screen also displays an image 70 of what the key for this particular lock should look like. After entering the desired selections, the user clicks on the "select" button 69 to proceed to the next screen.

If the user opts to enter a key identifier such as a key number to be matched in step 68, the system first checks whether the selected lock is available for that key number. Different padlocks typically have certain keyways which can be opened by specific types of keys available in specific key number ranges. Padlock keyways can only be customized to be opened by certain types of keys, so that a user cannot order every single available type of padlock for their specific key number, as discussed in more detail below. The data base 16 in this system includes stored information on the key number ranges usable with each lock body available for customizing and purchase, as described in more detail below. Therefore, once a user has specified a certain lock body, the controller checks the list of available keyways and key number ranges against the entered key number and determines whether the selected lock is available (step 72). If the key number is not available for the selected lock, the user is directed to a different screen showing locks which can be ordered for that key number (step 74), as described below in connection with FIG. 3A and the associated screen shot of FIG. 18A.

Figure 12A:
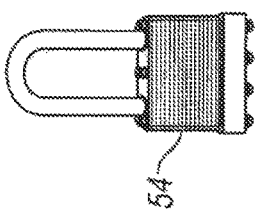
Figure 15:
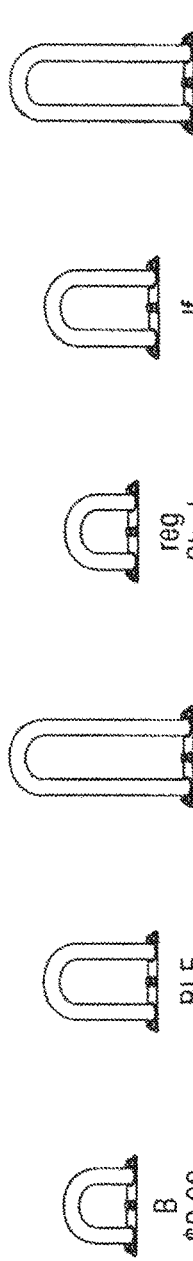
FIG. 15 is a screen shot of another administrator entry screen to associate available keying options, shackle images and bumper images with a particular lock body.

Once the user has selected the number of keys and whether or not a key number is to be matched, a new screen appears, as illustrated in FIG. 12A. This again shows the customized lock 54 and the same customized lock information, as well as the selected key number if the user has selected matching to their existing key number. The cost for each lock body is displayed, along with the cost for any additional keys ordered, the cost for any custom text, and the cost for a custom cylinder if the user has requested matching to their existing key number. The user can then enter the desired number of locks to purchase in block 75 (step 76 of FIG. 2A), and clicks on "Add to Cart" 77 to proceed to checkout. At this point, an online checkout page appears on the screen, as illustrated in FIG. 13, where the user can view the options selected so far and update the numbers of keys ordered as desired. A conventional online secure checkout procedure is then initiated, allowing the user to enter billing and shipping information (step 78) in a secure manner, after which they may log off the system or continue shopping (80).

Figure 2A:
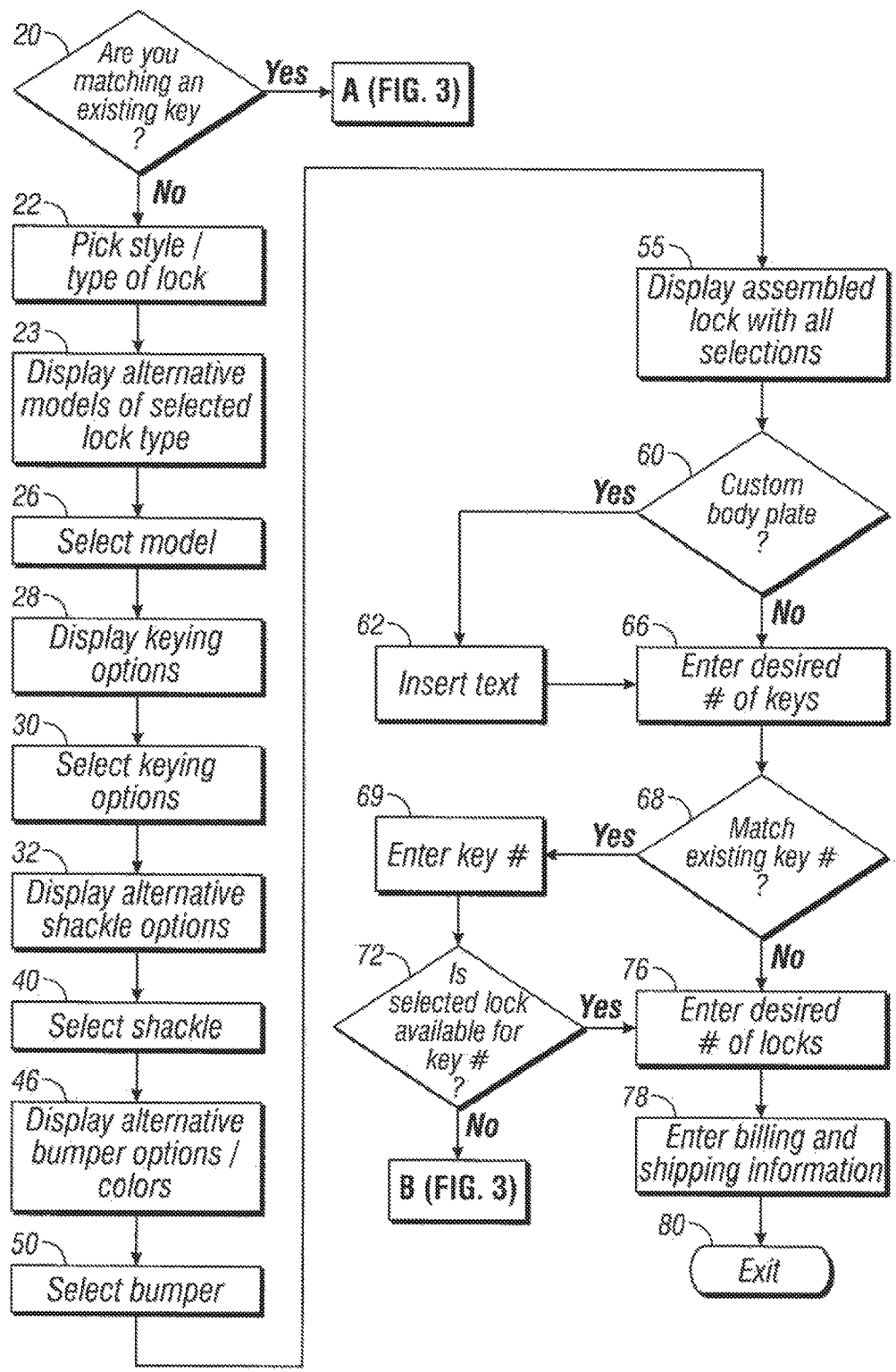
FIGS. 2A and 2B are flow diagrams illustrating an embodiment of a padlock ordering method using the system of FIG. 1 to order a customized lock, as also illustrated in the screen shots of FIGS. 5 to 13.
Figure 2B:
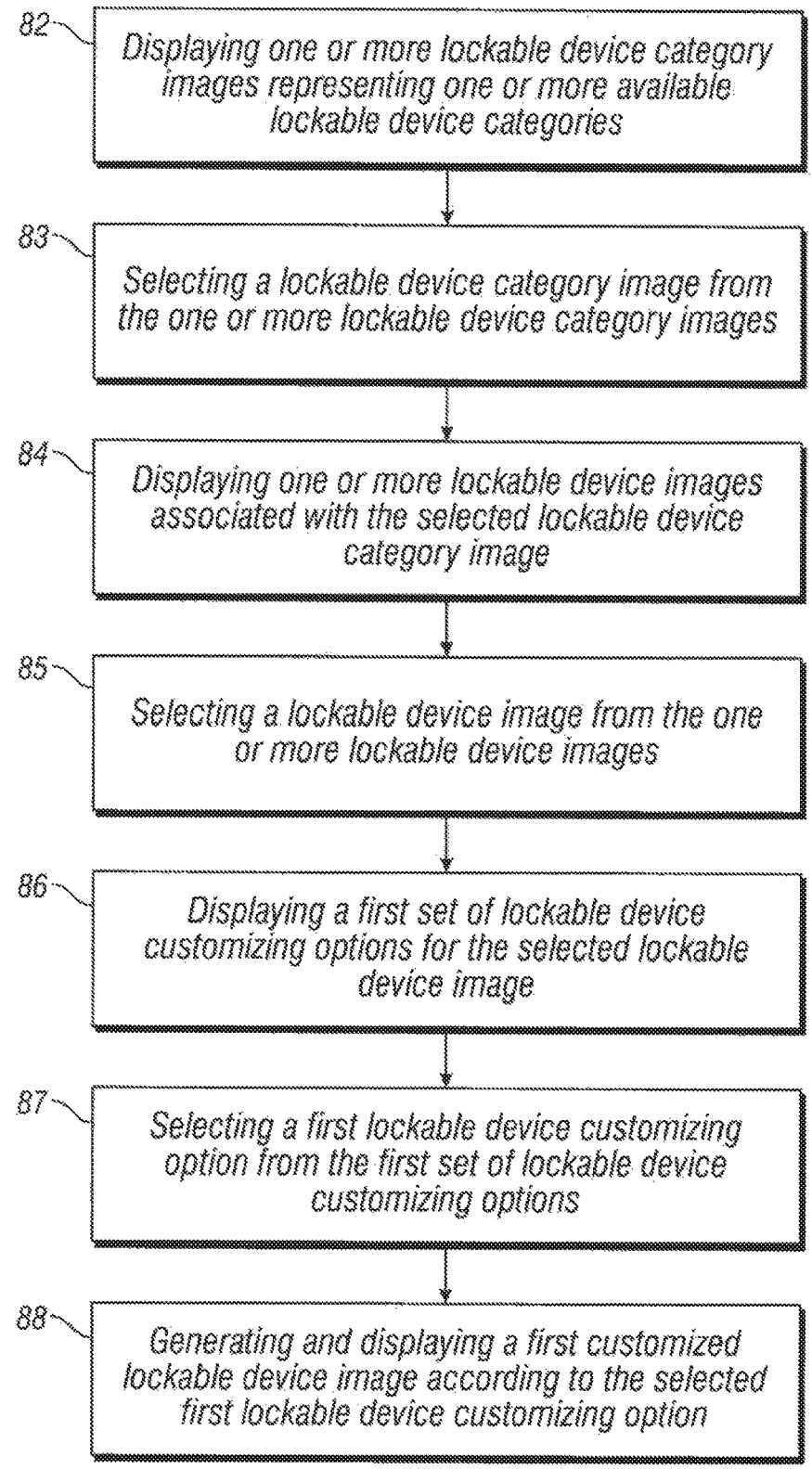

FIG. 2B is another flow diagram illustrating an embodiment of a padlock ordering method using the system of FIGS. 1A to 1C to order a customized lock, as also illustrated in the screen shots of FIGS. 5A to 13. At block 82, the process starts with displaying one or more lockable device category images representing one or more available lockable device categories. The one or more lockable device categories represent one or more lockable device images. The process then continues to block 83 where a lockable device category image from the one or more lockable device category images is selected. At block 84 one or more lockable device images associated with the selected lockable device category image are displayed. The one or more lockable device images represent one or more lockable devices. At block 85 a lockable device image from the one or more lockable device images is selected. The process then continues to block 86 where a first set of lockable device customizing options for the selected lockable device image are displayed. At block 87, a first lockable device customizing option from the first set of lockable device customizing options is selected. Finally at block 88 a first customized lockable device image is generated and displayed according to the selected first lockable device customizing option, wherein the first customized lockable device image include at least a portion of the selected lockable device image and the first lockable device customizing.

Figure 5B:
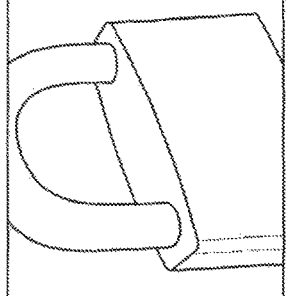
Figure 5B:
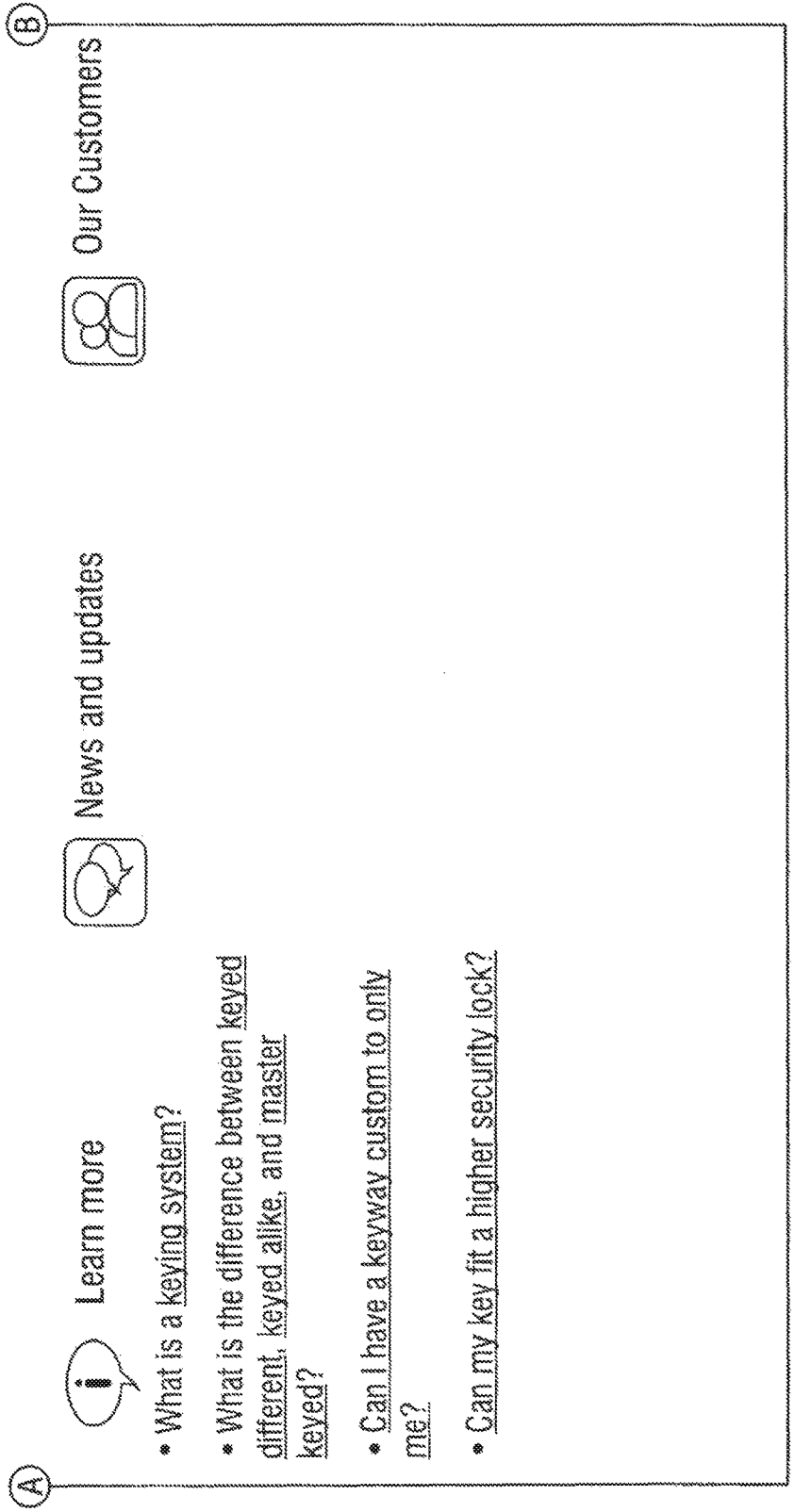
Figure 6C:
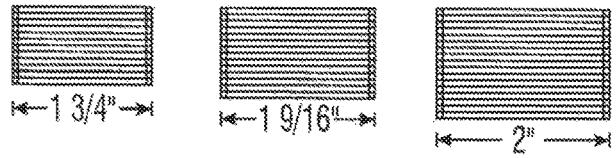

FIG. 5B illustrates a modified home page in a second embodiment of a series of user interface screens for carrying out the method of FIGS. 2A and 2B. This page includes various icons which can be clicked on to obtain more information about the system, as well as an icon 210 for starting the process of building a lock, and an icon 19 similar to that of the previous embodiment for matching an existing key number. FIG. 6B illustrates a user interface screen on which the user may select a lock type (step 82 of FIG. 2B), with images of various different lock types. Although FIG. 6B illustrates only padlocks, other types of locks may also be displayed on this page, as in FIG. 5A. Once the user selects a lock type, the screen shot of FIG. 6C appears, in which the alternative options for a first customizable option are displayed. In this case, the customizable option is a lock body. Unlike the previous embodiment, only the customizable portion 212 of the lock body is shown (in this case different body designs). A summary list 214 of the various customizable options is provided on the right hand side of the screen. This list is ongoing on each successive screen and lists the details of any options selected by the user so far in the process, so that the user can easily keep track of their selections. At this point, no customizing options have been selected.

Figure 8A:
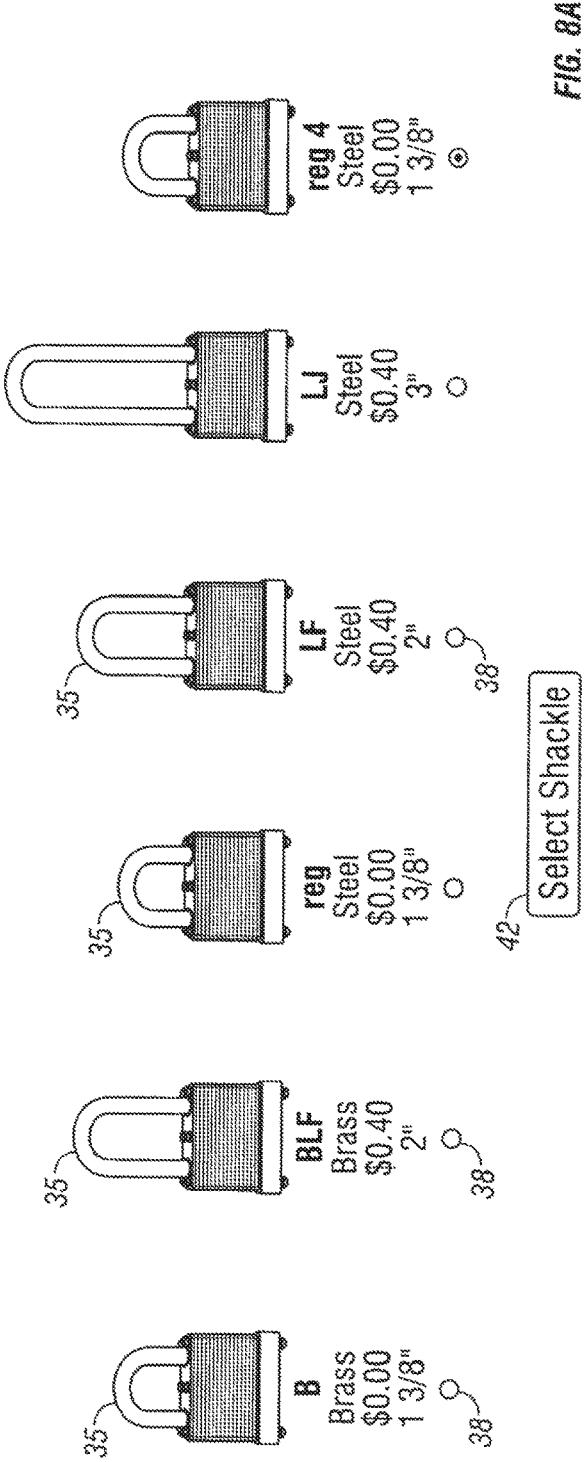
Figure 9A:
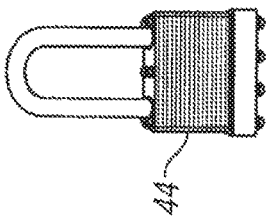

Once the user selects a lock body by clicking on the associated selection icon 215, the next screen of FIG. 7B appears. This is similar to FIG. 7A and allows the user to select a keying option. FIG. 7B also displays the updated summary list 214 indicating the selected lock body as well as an image 216 of the lock portion selected so far, unlike FIG. 7A where an entire lock is displayed. Once the keying option is selected, the next screen of FIG. 8B is displayed, in which different shackles 218 are displayed. This is similar to the screen of FIG. 8A except that only the shackle image is shown, not an entire lock, and the summary block or list 214 on the right hand side displays the portion of the lock selected so far as well as details of the options selected so far (lock body and keying option). Once a shackle is selected, the screen of FIG. 9B appears. This is similar to FIG. 9A, and allows a user to select another customizable option, specifically a bumper color. A series of images 45 of the different bumper colors appears, as in FIG. 9A. The summary list 214 on the right hand side now includes an image 218 of the selected lock body with the previously selected shackle attached, and the details are updated to indicate all options which are already selected (lock body, keying option, and shackle).

Figure 10A:
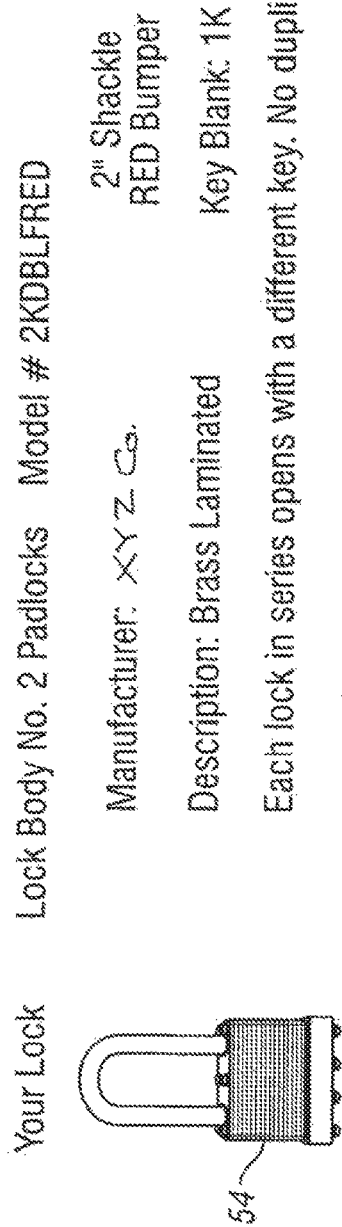
Figure 10D:
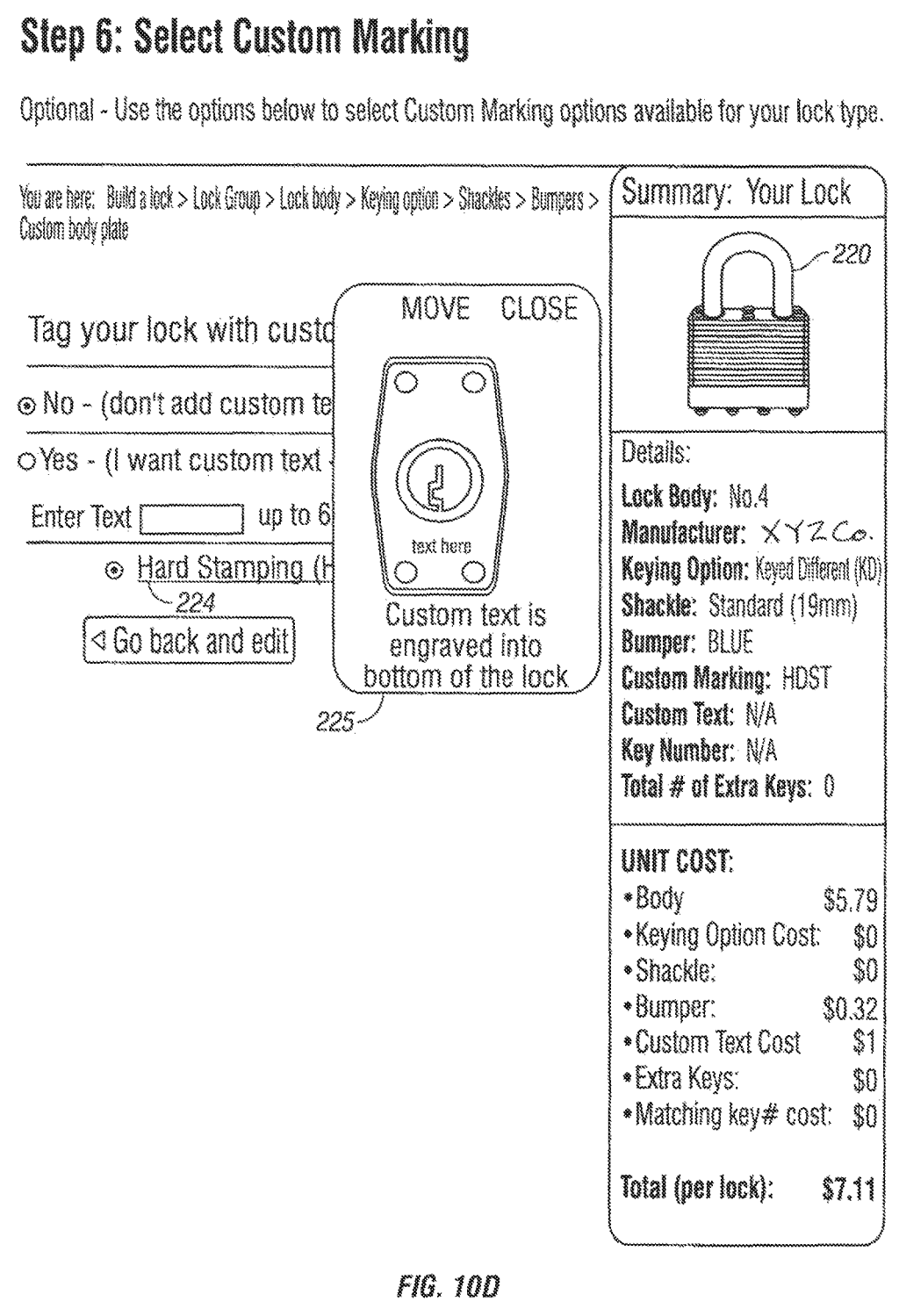

The user then selects a bumper 45 of the desired color, and the screen shot or user interface of FIG. 10B appears. This is similar to FIG. 10A and allows the user to select custom marking. The lock summary or list 214 on the right hand side now includes the selected bumper in the lock image 220, as well as the bumper color in the listed details. If the user selects no custom marking, the next screen shot or interface is that of FIG. 11B. If the user clicks on the Yes button to select custom marking, a box 214 appears to allow entry of the desired text, as illustrated in FIG. 10C. The user can also select a stamping option on this page, such as hard stamping 224. Although only one stamping option is shown in FIG. 10C, in practice various different options are provided in this area of the screen. If the user clicks on the hard stamping text 224, an image or box 225 appears which shows the appearance of the bottom face of the lock with indicia applied by hard stamping, as illustrated in FIG. 10D. The user can click on the text describing other types of stamping options, with examples of the types of stamping appearing in box 225 when the user clicks on the respective options. The user clicks on the selection key 226 next to their selected stamping option once they have decided which stamping type they want. Once a stamping option has been selected, the screen of FIG. 11B appears. In this screen, the user can decide whether to match an existing keying system, by selecting the No or Yes options on this page. The user also selects a number of extra keys, if desired. This is similar to the screen shot of FIG. 11A except that no key is displayed and the organization of information on the page is different. If the user selects the No button on FIG. 11A, the next screen of FIG. 12B appears. If the user selects the Yes button, as illustrated in FIG. 11B, a box 226 appears for the user to enter a key number. In each of the screens of FIGS. 11A and 11B, the summary or list 214 includes all lock selections so far, including any custom text. If the user opts to match an existing key, the system proceeds as described above in connection with selection of that option in FIG. 11A. If the user opts not to match an existing key, the screen of FIG. 12B appears which allows a user to review their selections and decide whether to proceed to the payment process starting with the screen of FIG. 13. As in FIG. 12A, the screen of FIG. 12B illustrates the finished lock along with all options selected, and displays the cost for individual selected items and the total cost for all selections.

In order to set up the system and method of FIGS. 1, 2 and 5 to 13, the system administrator at the back end 15 first enters details of each product or item available for purchase into the product database, along with all characteristics of the item which may be customized. In order to allow customers to customize or build a padlock, images of each available padlock are entered, along with images of the customizable options, such as the different shackles, the different bumper colors, and so on. For each lock body, the data base includes images of a standard lock body 100 with an exemplary shackle and bumper, images of each available bumper and images of a central part 101 and lower part 102 of the lock body, as illustrated in FIG. 14. The data base also includes images of each shackle which is available for the stored lock body, and each available bumper (see FIG. 15). The images are combined together as appropriate based on customer selections. Thus, if the customer selects the longer shackle in the screen of FIG. 8A or 8B, the system accesses the data base 16 to locate the image of the longer shackle, attaches this shackle to the upper end of the selected lock body 102, and inserts this image 44 at the appropriate location in the next screen (FIG. 9A or 9B). When the customer selects a particular bumper color, the system again accesses the data base to locate the image of the selected color bumper, and inserts this image on the bottom of image 101 together with the selected shackle at the top to display the combined image 54 with both the customer selected shackle and the customer selected bumper in the next screen (FIG. 10A or 10B).

When entering information on a particular lock body, the operator or administrator also enters the keying options for that lock (see FIG. 15), and other information about the lock as indicated in FIG. 14, such as a selected written description of the lock manufacturer name, key blank, group number, and prices for the lock body and each available customized option, e.g. shackle, bumper, extra keys, custom bottom plate, custom cylinder to match key number, and the like. Any of these prices can be updated by the administrator at any time.

In the foregoing embodiment, the system is set up for allowing a user to customize padlocks ordered on line. In alternative embodiments, a similar system and method may allow users to order other customized items in a similar manner. For example, in a system for ordering customized boxes or packaging, the data base may store information and images of the following variables which the user can customize:

1. Box sizes
2. Color
3. Material
4. Option to upload logos or company information to be printed on the box
5. Quantities to be ordered
6. Single walled, double walled, triple walled options
7. Option to order tape with matching company logo.

In this system, the first screen may display different available box designs so the user can easily select a desired box design (e.g. shape, lid design, and the like). Subsequent screens may display different sizes, different colors, and so on for the selected box design. The data base includes images of the different options which can be combined and displayed to the user on screens depending on the user's selections.

In another embodiment, promotional items may be customized and ordered by users on line. In a first screen, images of the different promotional items available for order may be displayed. The user is then directed to screens allowing various options to be customized, depending on the promotional item selected, such as color, imprintable area for customized text, logos or images to be added on the item, quantities, and packaging styles.

The foregoing embodiments concern customizing of products ordered on-line, along with an associated data base which organizes the available products in a manner which makes it relatively easy for users to view customized options on a step-by-step basis, as well as to view the final customized product prior to ordering the desired number of customized products. FIGS. 1A to 1C, 2A, 3A, 3B, 4, and 16 to 21 illustrate an embodiment of a method and system for keyway matching in which a user can order additional locks of one or more different body types to match their existing keys. This is convenient since it allows a business owner, consumer, or other user to have multiple locks which can be opened by the same key, rather than having to keep multiple keys for different locked devices. This method and system is associated with the method and system of FIGS. 1, 2 and 5 to 13, and there is some overlap between the two embodiments, as seen in FIGS. 1 to 4 and described in more detail below.

As has been noted above, padlocks and the like have cylinders pinned to match specific key numbers. The cylinder size restricts the key numbers that can be used with specific padlocks. Key number ranges correspond to different types of key blank, and each padlock or other lock can be used only with certain key number ranges. For example, a padlock body No. 1, No. 2 or No. 475 made by Master Lock can be used with key numbers in the ranges 2001-2997 and X2000-X2998. Other lock and padlock manufacturers have other standard key numbers or ranges which can be matched by the keyway matching process described herein. In order to enable key matching, the information stored in the product data base 16 of FIG. 1A includes all different types of key blank along with an image of the key blank, the keyway or key number ranges for that key blank and a list of the lock models which can be opened with that key blank. Each lock model stored in data base 16 is then linked to each of the key blanks which can be used with the lock model. FIGS. 16A and 16B illustrate the steps of adding a new keyway to data base 16.

As illustrated in FIG. 16A, the information entered and stored for an exemplary key blank, such as the 15K key blank illustrated in FIG. 16A, includes an image 82 of the key blank (which is used in the screen display of FIG. 11 of the previous embodiment), the keyway name and manufacturer, the key type (such as master or the like), and the key blank model number, in this case 15K. All available lock models which can be opened by a key using that key blank can be entered by the administrator in box 84 of FIG. 16A, and an image 85 of each entered lock model is associated with the information stored for that key blank. In the database, there are four fields to enter a keyway range associated with a key blank and certain lock models. These fields are illustrated in FIG. 16B, and comprise two numeric fields 86 and two non-numeric fields 88. FIG. 16B illustrates the step of entering the keyway ranges for the particular key blank in boxes 86 for numeric keyway ranges and boxes 88 for non-numeric ranges. In this case, the keyway range includes a non numeric digit and is 20N001 to 25N616, but other key blanks are associated with numeric ranges. If the keyway range is numeric, the administrator enters the start and end of the range in fields 86, and enters zeros in the fields 88. If the keyway range is non-numeric, the administrator enters the start and end of the range in fields 88 and enters zeros in fields 86.

Figure 16C:
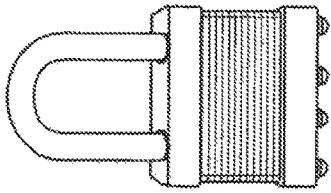
Figure 17A:
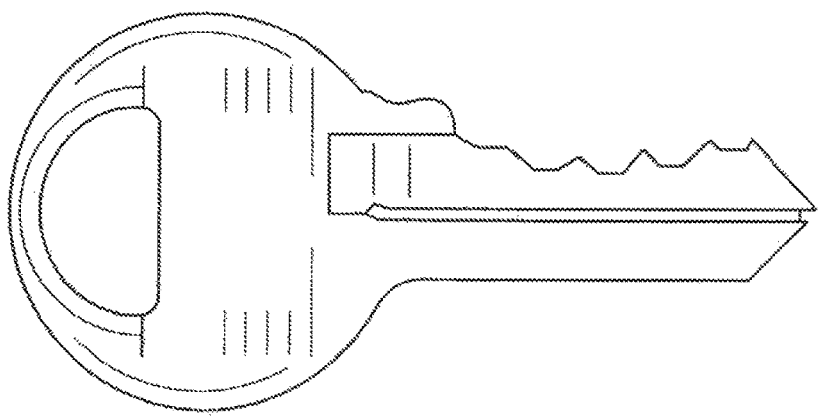

FIG. 16C illustrates a step in adding the keyway range to information stored in the data base for each lock model. The illustrated example is for No. 5 Padlocks, and the administrator display includes an image 90 of the lock body of a No. 5 Padlock. The administrator enters the key blank (in this case 1K), and this associates the lock body with the entered keyway ranges for key blank 1K. If a lock body can be opened by various different key blanks, each key blank for the lock body is entered and the stored lock body is linked to the stored keyway ranges.

Figure 3A:
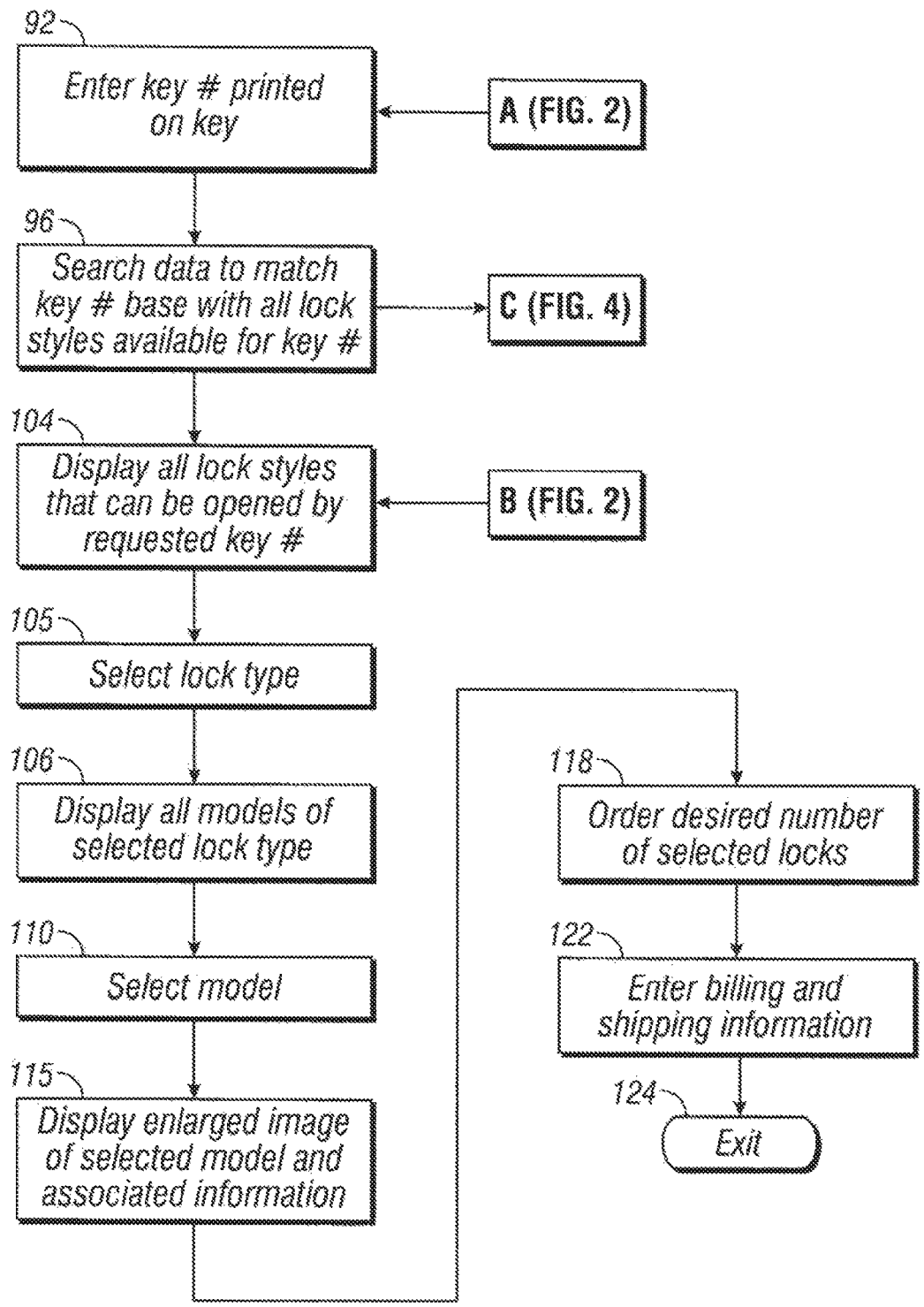
FIGS. 3A and 3B are flow diagrams illustrating steps of an embodiment of a keyway matching method for ordering locks which can be opened by a particular key number, as also illustrated in the screen shots of FIGS. 15 to 19.
Figure 4:
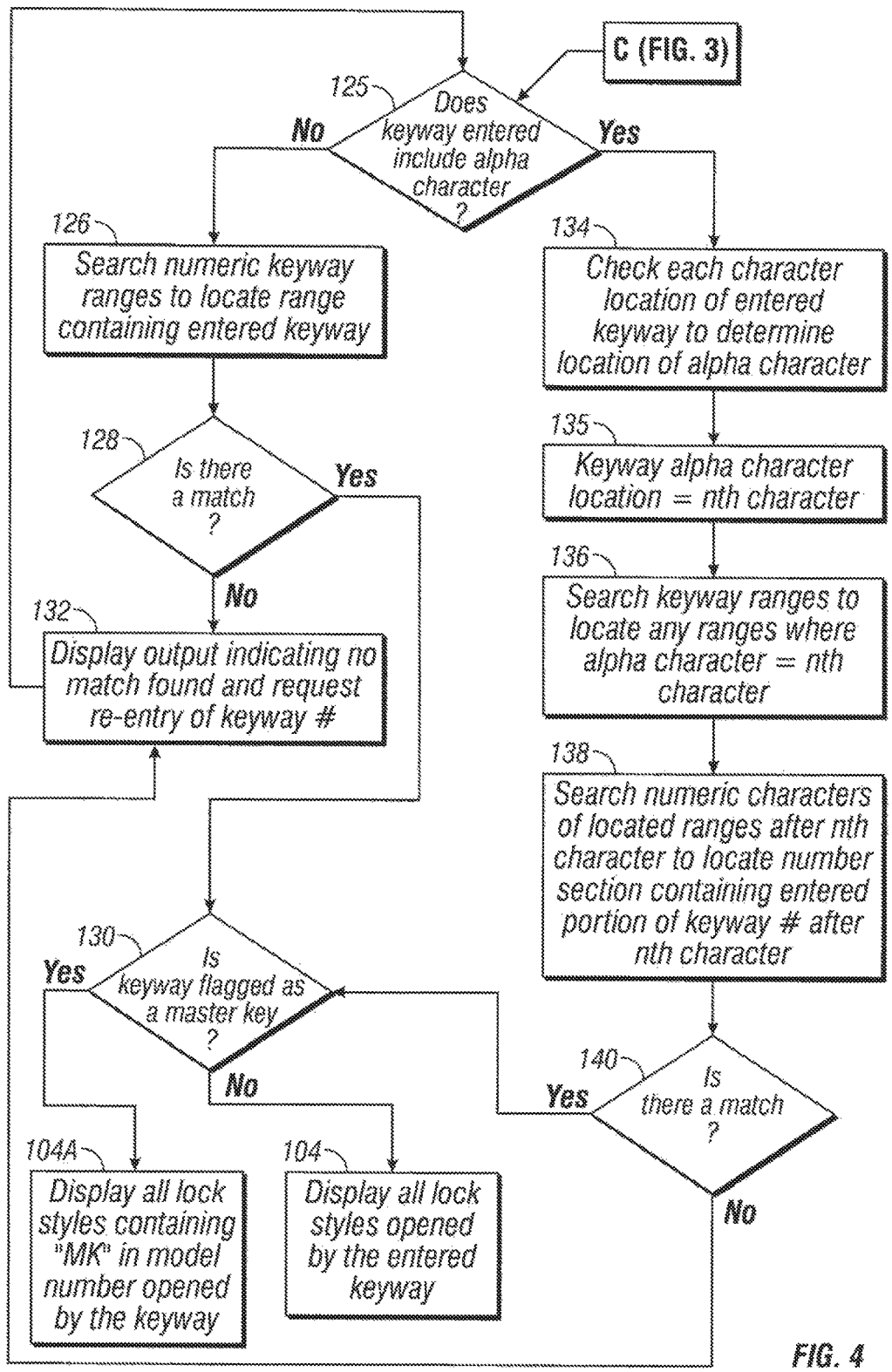
FIG. 4 is a flow diagram illustrating more details of part of the keyway matching method of FIG. 3A.

FIG. 3A is a basic flow diagram of the steps involved in matching a key number to specific lock body models which can be opened by the key, with FIG. 4 illustrating the keyway matching method in more detail. The website may display an icon 19 on the home page of FIG. 5A or 5B to allow a user to match an existing key number to a lock body directly, rather than going through the steps of customizing a lock as in FIG. 2A. Additionally, or alternatively, the keyway matching procedure may be initiated by a user who is customizing a lock at step 68 of FIG. 2A, where the user may choose to enter an existing key number in block 65 of FIG. 11A or 11C, rather than letting the system select a new key number from the range available for the customized lock body.

Figure 18B:
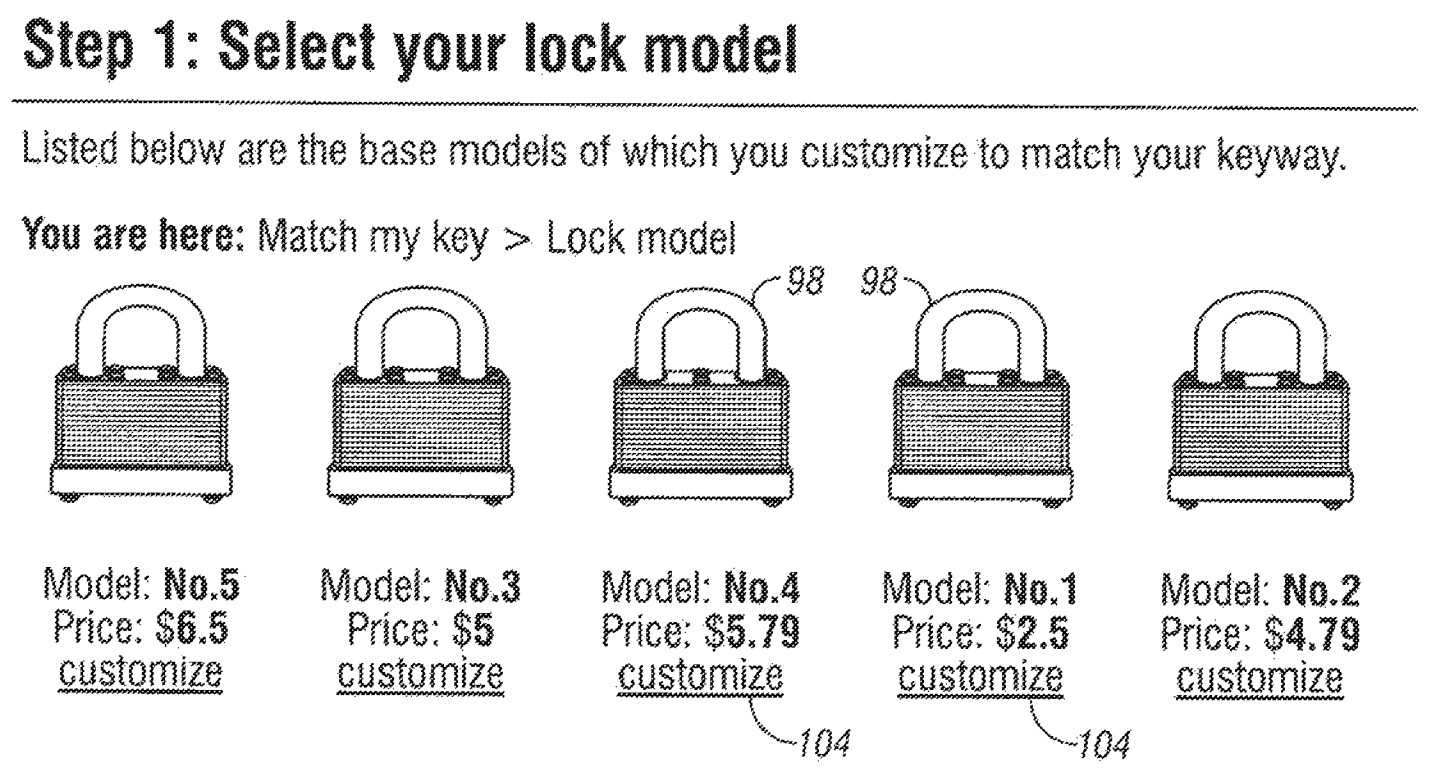

Regardless of whether the user chooses to match a key number to a lock body initially from the home page or screen of FIG. 5A or 5B, or enters the key number during lock customization, the first step 92 in the method comprises entry of the key number on the key in a box provided for that purpose. Clicking on icon 19 of FIG. 5A or 5B produces the screen display of FIG. 17A or 17B with box 94 to enter the key number. The user then hits the "Go" key 95 on the screen, which starts the key matching routine of step 96, described in more detail below in connection with FIG. 4. After the keyway range containing the entered key number is found, images 98 of all of the types or models of lock which can have cylinders pinned to provide a keyway matching the entered keyway number are displayed on the screen, under an image 99 of the key along with the entered keyway number 150, as illustrated in FIG. 18A or 18B (step 104 of FIG. 3A). This display screen is also generated if a user enters a keyway number at step 69 of FIG. 2A, as indicated in FIG. 3A.

Figure 19:
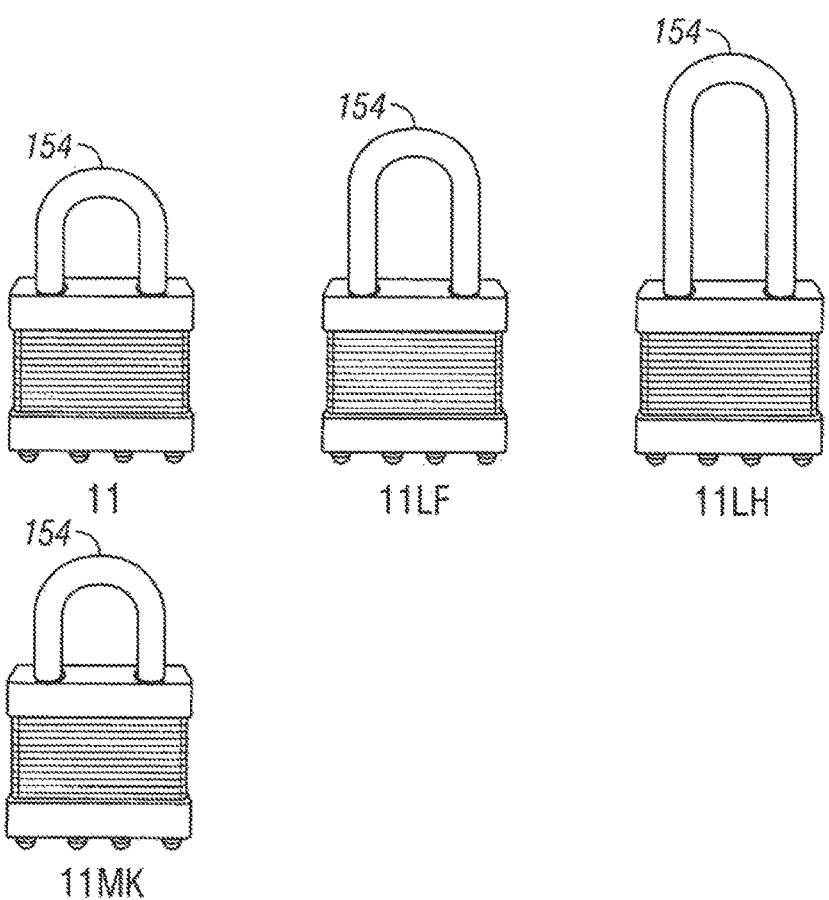
FIG. 19 is a screen shot of lock models displayed after a user has selected a lock from the screen of FIGS. 18A and 18B.

As illustrated in FIG. 18A, a button 104 entitled "Click Here to Customize This Lock" is positioned next to any lock 98 on the screen which can be customized, and the user clicks on button 104 if they want to customize the lock. There is no button 104 adjacent any lock which cannot be customized, such as the No. 475 Hasplock of FIG. 18A. In the embodiment of FIG. 18A, a button entitled "Show Models" 152 is also positioned alongside each displayed lock, regardless of whether it can be customized. The user selects one of the buttons 152 next to any lock if they want to pick a lock which cannot be customized or are content with an off-the-shelf lock without customizing the lock. This results in a screen showing all standard off-the-shelf alternatives 154 for that lock, as illustrated in FIG. 19. The user is instructed to click on the locks in order to display more information or order the lock. If the user decides that they do not want to select one of the lock models displayed in step 106, they can click on "Back to Search" 108 in order to return to the previous screen of FIG. 18A. In the alternative of FIG. 18B, all the lock models 98 for a particular key are displayed for user selection on the first lock model selection screen.

Figure 20B:
Figure 20C:
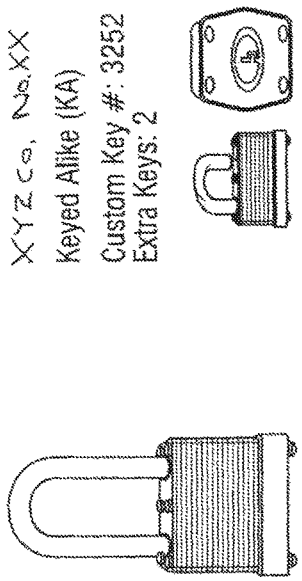
Figure 20D:
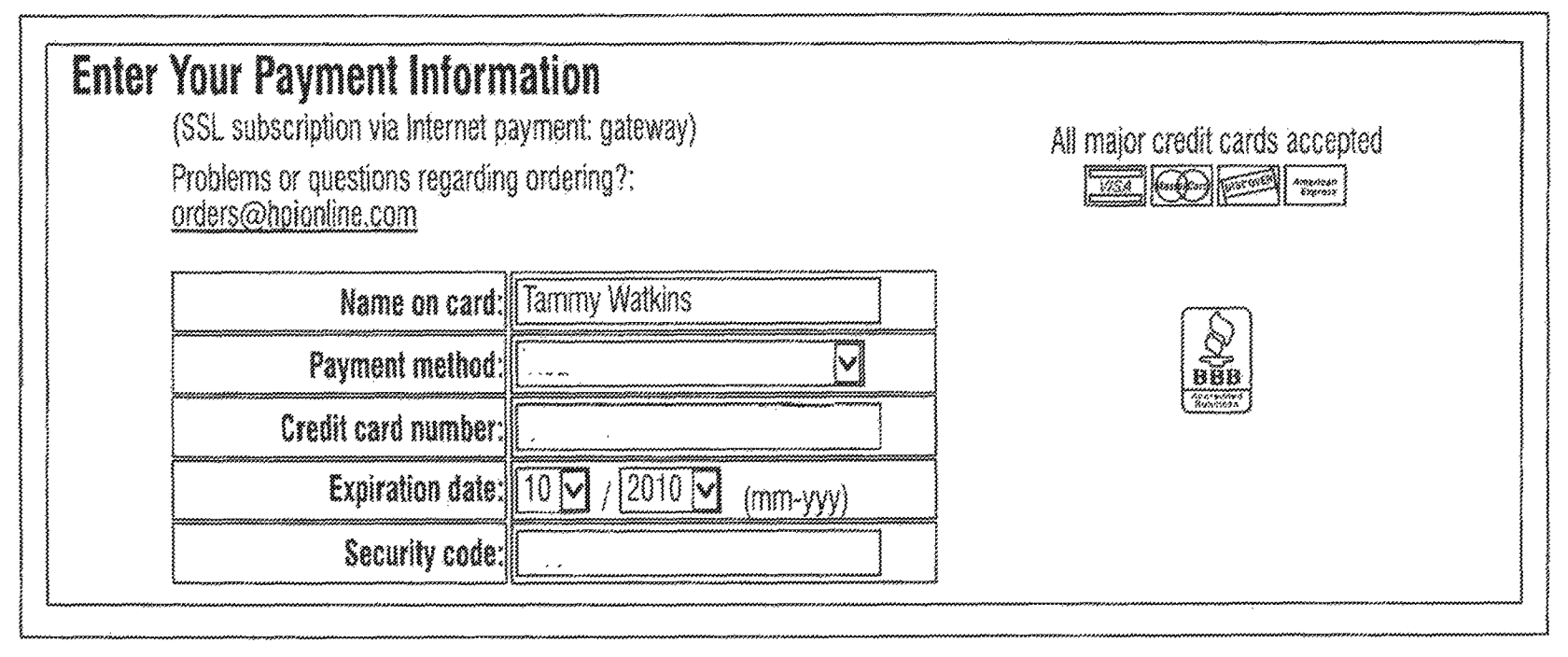
Figure 21B:
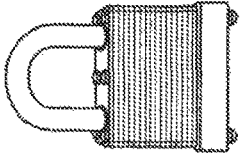
Figure 21B:
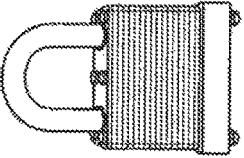

Any displayed lock body in FIG. 18A or 18B, which has custom options, may have a "customize this lock" link 104 adjacent its image, which links to the screen of FIG. 7A or 7B of the previous embodiment and allows the same customizing steps as illustrated in FIG. 2A. Assuming customer options are not available or the user chooses not to customize the lock, the user clicks on a selected model (step 110) in FIG. 18B or 19 in order to proceed to the next screen of FIG. 20A or 20B. In either case, an enlarged image of that lock body appears, along with thumbnail views of the lock from different directions, dimensional information, and the like (step 115 of FIG. 3A). The user has the option of returning to the previous display of different model numbers by clicking on area 116, or ordering a desired number of the displayed lock body at box 117 (step 118 of FIG. 3A). In the embodiment of FIG. 20A, comments or instructions may be entered in box 119 on this screen prior to clicking on "Add to Cart" box 120. Prices also appear on the screen of FIGS. 20A and 20B. The next screens of FIGS. 20C to 21C are conventional billing and shipping selection screens on which the user can enter billing and shipping information. During secure checkout, the user enters billing and shipping information (step 122 of FIG. 3A), and can choose to exit the system (124), or may return to shopping. In the embodiment of FIGS. 21B and 21C, an actual model number 230 for the selected lock is only displayed when the user has paid for their order, as illustrated in FIG. 21C. Prior to this step, the key models are associated with temporary or incomplete model numbers 232 (FIG. 21B) which cannot be used to order the locks directly from the manufacturer.

Figure 3B:
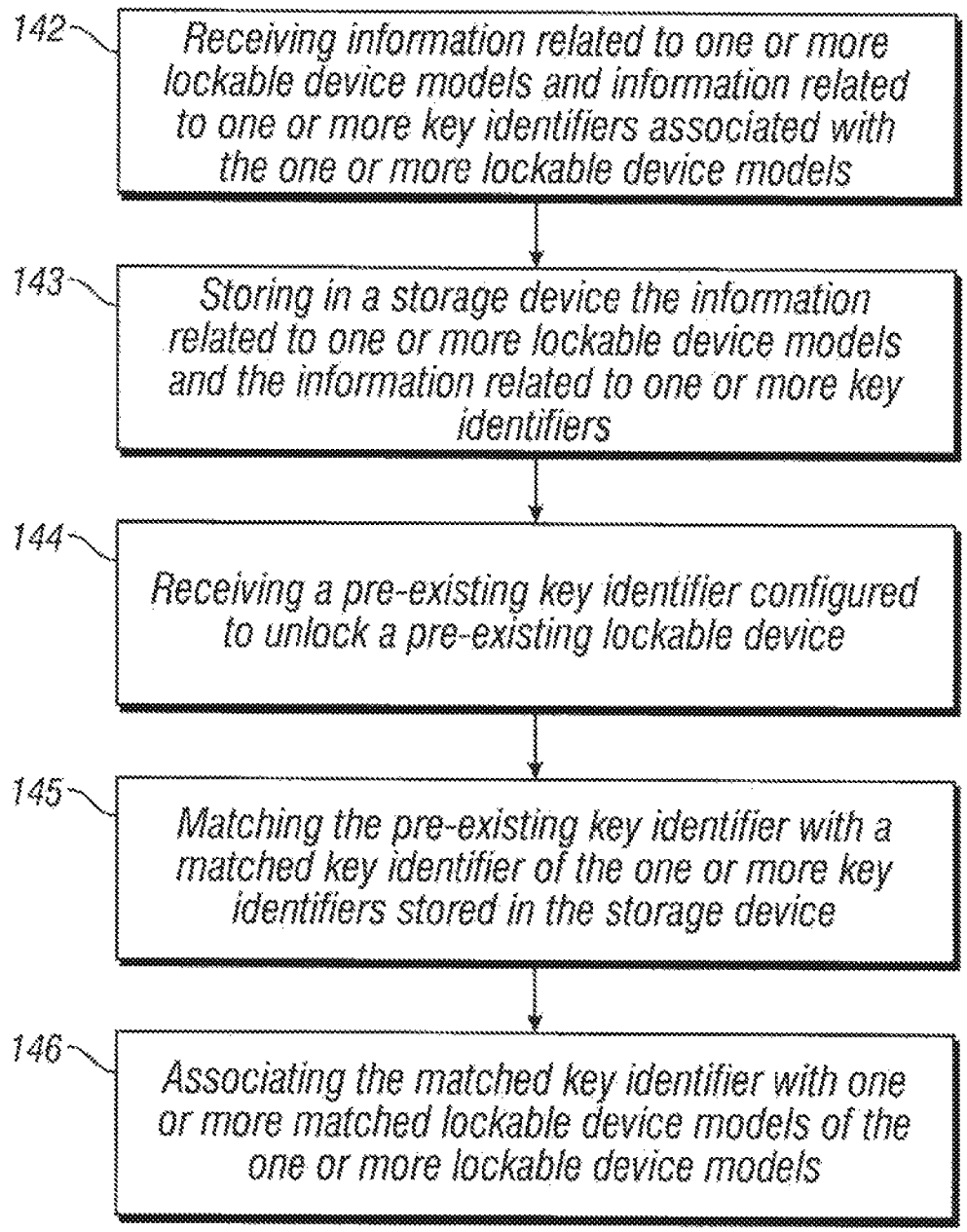

FIG. 3B is a flow diagram illustrating steps of an embodiment of a keyway matching method for ordering locks which can be opened by a particular key number, as also illustrated in the screen shots of FIGS. 15 to 19. At block 142, the process starts with receiving information related to one or more lockable device models and information related to one or more key identifiers such as key numbers associated with the one or more lockable device models. Each key identifier of the one or more key identifiers is configured to unlock at least one lockable device associated with the one or more lockable device models. At block 143, the information related to one or more lockable device models and the information related to one or more key identifiers associated with the one or more lockable device models are stored in the storage device 16. The process then continues to block 144 where a pre-existing key identifier configured to unlock a pre-existing lockable device is received. At block 145, the pre-existing key identifier is matched with a matched key identifier of the one or more key identifiers stored in the storage device. Finally at block 146, the matched key identifier is associated with one or more matched lockable device models of the one or more lockable device models.

In one embodiment, the product data base has information stored on all available locks and padlock and the associated key identifiers such as key numbers, and the keyway matching procedure comprises searching the data base for associated locks and padlocks based on an entered key identifier. An alternative embodiment of the keyway matching procedure 96 of FIG. 3A is illustrated in more detail in FIG. 4. The first step in this procedure comprises determining whether or not the entered key number, key identifier or keyway contains an alpha character (step 125), i.e. whether each character of the key number is numeric, as follows:

If Numeric(key_num)=True, then if this=true, we search the numeric versions of the beginning and ending keyway numbers in fields 86 (see FIG. 14B) for any range containing the entered keyway number (step 126), using the following step:

SQL="SELECT*FROM keyways where "'&key_num&'" between (keyway_begin−1) and (keyway end+1)"

If a match is found (step 128), the system determines whether the keyway or key identifier is flagged as a master key (step 130). If not, all lock models opened by the keyway are displayed in step 104 (equivalent to step 104 of FIG. 2A). If the keyway is flagged as a master key, all lock styles containing "MK" in the model number which are opened by the keyway are displayed (step 104A). If there is no match found to the entered keyway, an output screen indicates that no match was found and requests re-entry of the keyway number in step 132, in case the user made an error in the initial keyway entry. The system then returns to step 125. If a keyway match is still not found, other action may be taken such as asking the user to call a service number.

At step 125, if Numeric(key_num)=False, the entered keyway number contains an alpha character, and the entered keyway is checked to determine the location of the alpha or non-numeric character (step 134). Some keyways contain the same alpha character but rarely in the same location. A first step in determining the alpha character location is to determine the length in characters of what was entered by the user, i.e. the number of digits entered, as follows:

LenX=len(key_num)

This returns a number equal to the length of the keyway in characters. Then the system loops through the string one character at a time, testing each character starting with the first character to see if it is an alpha (there can only be one alpha in any keyway). When the character is located, its position in the string of characters is noted, e.g., Alpha character location=nth character in string (step 135).

The next step is to search stored non-numeric keyway ranges to locate all stored ranges where the alpha character is the nth character in the string (step 136). If it is the first character—then the beginning number of every non-numeric range is searched for any keyway that has that character as the first character, as follows:

SQL="SELECT*FROM keyways where left(keyway_begin1,1)="'&test&'""

Where test=the alpha character found.

Once all keyway ranges are found which have the character as the nth character in the string, the numeric characters or sections of each located range which occur after the nth character are searched (step 138) to locate any section range which contains the entered portion of the keyway after the nth character of the entered keyway. In other words, where the first character of the keyway is the alpha character, the alpha character is stripped from the beginning and end of the stored range and from the keyway entered by the user. This leaves three numbers. For example, if the entered keyway is X2099, the matching keyway range is X2000=X2998, and the stripping process would leave the following three numbers:

Start of range=2000; End of range=2998; Entered keyway=2099.

This allows a check to be made in order to determine whether the number section of what the user entered falls between number section of the begin and end of the keyway range, as follows:

```
Loop through the range
pass_test=0
do while begin_range < end_range
    if begin_range = cdbl(key_num_entered) then
    pass_test=15
    end if
Loop
```

This tests the numeric section of the entered key number (e.g. 2099) against every number between 2000 and 2998.

If there is a match "pass_test=15" otherwise "pass_test=0"

If it=15 then all the lock series that can be opened by that keyway are displayed with a link for each to display all the models of that series. Otherwise if it=0 it displays a warning that it is not a match to the keyway as the alpha and numeric portions don't both match and gives the user another chance to search for a keyway, assuming they didn't type the keyway exactly as it is printed on the key they are trying to match. This process can be repeated for all keyway ranges starting with the letter "X". The same basic loop above is used for testing an entered numeric keyway against all numbers in a stored numeric keyway range (step 126).

If a match is found (step 140), the system proceeds to step 130 to determine whether the keyway is flagged as a master key (this is part of the information stored in the keyways section of the data base), proceeding to either step 104 or step 104A. If no match is found at step 140, the system proceeds to step 132.

If the alpha character is not the first character, the programming forks to a different section that works just like the first character section but tests the numeric section after the alpha character, e.g. from position 3 or 4 onwards, and compares it to the same part of what the user entered.

Although the keyway matching method and system is described above for matching keys to padlocks, it may also be used for matching keys to other types of locks, such as door locks, lock boxes, safes, and the like.

In the past, it was not possible for customers to purchase customized padlocks online. Even distributors could not build a lock unless they already knew the model number and key number. The above embodiment for customizing a lock displays images of different lock categories so that a user can easily select a desired lock category, such as shrouded, laminated, solid brass, high security, brass laminated, and the like, and then goes on to display images of different lock bodies available in the selected category. Once the user has selected a lock body, they are allowed to customize aspects of the body such as type of shackle and bumper color, and can select a customized body plate with text which they enter. The same website may display locks of only one manufacturer, or locks of different manufacturers, allowing selection from a large body of different locks. A similar system may be used to allow customers to select and customize different types of products without having to go through many screens in order to locate the product they want. Instead, a single page or screen already displays images of products in the same general category for the customer to click on.

The back end control system or administrator system can be easily updated to add different products to the data base. This system may be linked to different websites and may provide all of the stored information to each website, or selected portions to different websites. Prices can be readily updated, and the data base may include stored prices which are different for different websites 10.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine and the processing can be performed on a single piece of hardware or distributed across multiple servers or running on multiple computers that are housed in a local area or dispersed across different geographic locations. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein are representative of the subject matter which is broadly contemplated by the present invention. It is further understood that the scope of the present invention is not intended to be limited to the embodiments shown herein but encompasses embodiments that may become obvious to those skilled in the art and that the scope of the present invention is accordingly limited by nothing other than the appended claims.

The invention claimed is:

1. A non-transitory computer readable medium having stored thereon instructions that, when executed by a processor, cause the processor to:

store a representation of each of a plurality of lockable device models in association with at least one key identifier, wherein each at least one key identifier comprises a set of one or more key identifiers or a range of key identifiers that identify a key by which the associated lockable device model can be configured to be unlocked;

generate at least one screen, in a graphical user interface, that comprises an input for receiving a key identifier;

receive a user input of a key identifier via the at least one screen;

match the received key identifier to the at least one key identifier associated with the stored representation of each of one or more of the plurality of lockable device models; and generate at least one screen, in the graphical user interface, that comprises a selectable visual representation of each of the one or more lockable device models.

2. The non-transitory computer readable medium of claim 1, wherein the one or more lockable device models comprise two or more lockable device models.

3. The non-transitory computer readable medium of claim 2, wherein the instructions further cause the processor to receive a user selection of the selectable visual representation of one of the two or more lockable device models.

4. The non-transitory computer readable medium of claim 3, wherein the instructions further cause the processor to generate at least one order screen, in the graphical user interface, for allowing a user to order at least one lockable device corresponding to the selected one lockable device model.

5. The non-transitory computer readable medium of claim 1, wherein the one or more lockable device models comprise at least one of a bicycle lock, a keyed locking cable, a door lock, and a safe lock.

6. The non-transitory computer readable medium of claim 1, wherein the plurality of lockable device models comprise different models of padlocks.

7. A system comprising:

at least one processor; and one or more software modules that, when executed by the at least one processor, store a representation of each of a plurality of lockable device models in association with at least one key identifier, wherein each at least one key identifier comprises a set of one or more key identifiers or a range of key identifiers that identify a key by which the associated lockable device model can be configured to be unlocked, generate at least one screen, in a graphical user interface, that comprises an input for receiving a key identifier, receive a user input of a key identifier via the at least one screen, match the received key identifier to the at least one key identifier associated with the stored representation of each of one or more of the plurality of lockable device models, and generate at least one screen, in the graphical user interface, that comprises a selectable visual representation of each of the one or more lockable device models.

8. The system of claim 7, wherein the one or more software modules further:

receive a user selection of the selectable visual representation of one of the one or more lockable device models, and generate at least one order screen, in the graphical user interface, that is configured to receive a user order of at least one lockable device corresponding to the selected one lockable device model.

9. The system of claim 8, wherein the one or more software modules generate a temporary model number for the at least one lockable device prior to completion of the user order.

10. The system of claim 9, wherein the one or more software modules generate an actual model number for the at least one lockable device in response to completion of the user order.

11. The system of claim 7, wherein the plurality of lockable device models comprise different models of padlocks.

12. A computer implemented method comprising using at least one hardware processor to:

store a representation of each of a plurality of lockable device models in association with at least one key identifier, wherein each at least one key identifier comprises a set of one or more key identifiers or a range of key identifiers that identify a key by which the associated lockable device model can be configured to be unlocked;

generate at least one screen, in a graphical user interface, that comprises an input for receiving a key identifier;

receive a user input of a key identifier via the at least one screen;

match the received key identifier to the at least one key identifier associated with the stored representation of each of one or more of the plurality of lockable device models; and generate at least one screen, in the graphical user interface, that comprises a selectable visual representation of each of the one or more lockable device models.

* * * * *